US010733905B2

(12) United States Patent
Mathias et al.

(10) Patent No.: US 10,733,905 B2
(45) Date of Patent: Aug. 4, 2020

(54) METHOD AND SYSTEM FOR LEARNING LANGUAGES THROUGH A GENERAL USER INTERFACE

(71) Applicant: LingoZING Holding LTD, Valletta (MT)

(72) Inventors: Michael John Mathias, Las Vegas, NV (US); Kyra Zinaida, Los Angeles, CA (US)

(73) Assignee: LingoZING Holding LTD, Valletta (MT)

( * ) Notice: Subject to any disclaimer, the term of this patent is extended or adjusted under 35 U.S.C. 154(b) by 505 days.

(21) Appl. No.: 14/732,226

(22) Filed: Jun. 5, 2015

(65) Prior Publication Data

US 2015/0356887 A1  Dec. 10, 2015

Related U.S. Application Data

(60) Provisional application No. 61/997,694, filed on Jun. 9, 2014, provisional application No. 61/997,696, filed on Jun. 9, 2014.

(51) Int. Cl.
*G09B 19/06* (2006.01)
*G06F 3/0484* (2013.01)
(Continued)

(52) U.S. Cl.
CPC ........... *G09B 19/06* (2013.01); *G06F 3/0482* (2013.01); *G06F 3/04842* (2013.01);
(Continued)

(58) Field of Classification Search
CPC .... G06F 17/289; G06F 17/28; G06F 17/2836; G06F 17/2827; G06F 9/4448;
(Continued)

(56) References Cited

U.S. PATENT DOCUMENTS 6,526,426 B1 * 2/2003 Lakritz ............... G06F 17/2258
704/8
2002/0111933 A1 * 8/2002 Noble .................. G06F 17/211
(Continued)

OTHER PUBLICATIONS

PCT Notification, International Search Report and Written Opinion, dated Apr. 28, 2016, 17 pages.
(Continued)

*Primary Examiner* — Jerry-Daryl Fletcher
(74) *Attorney, Agent, or Firm* — Barley Snyder

(57) ABSTRACT

A language learning system is provided. The language learning system includes a computing device and a language learning file. The computing device includes a general user interface and a central processing unit. The language learning file is run by the central processing unit and includes multilingual data, a language display module, and a language learning module. The multilingual data includes a graphical constant element and dynamic lexical elements corresponding to the graphical constant element and having native language data and secondary language data translating from the native language data. The display module displays the graphical constant element and a native language element of the native language data through the general user interface in juxtaposed position. The language learning module switches between displays of the native language element with a secondary language element of the secondary language data.

13 Claims, 25 Drawing Sheets

(51) Int. Cl.
*G06F 3/0482* (2013.01)
*G06F 3/0488* (2013.01)
*G06F 3/16* (2006.01)
*G09B 5/12* (2006.01)

(52) U.S. Cl.
CPC .......... *G06F 3/04883* (2013.01); *G06F 3/167* (2013.01); *G09B 5/125* (2013.01)

(58) Field of Classification Search
CPC .......... G06F 17/30669; G06F 17/2872; G06F 17/3089; G06F 3/167; G01L 15/005; G09B 19/06
See application file for complete search history.

(56) References Cited

U.S. PATENT DOCUMENTS

| | | | |
|---|---|---|---|
| 2002/0133523 A1* | 9/2002 | Ambler | G06F 9/4448 715/265 |
| 2008/0033712 A1* | 2/2008 | Yang | G09B 5/06 704/3 |
| 2009/0132232 A1* | 5/2009 | Trefler | G06Q 10/10 704/2 |
| 2011/0316769 A1* | 12/2011 | Boettcher | G06F 1/1684 345/156 |
| 2015/0051898 A1 | 2/2015 | Cuthbert et al. | |
| 2015/0052430 A1 | 2/2015 | Dwan | |

OTHER PUBLICATIONS

Anonymous: "understanding eyespeak feedback", May 30, 2015, XP055247803, Retrieved from Internet: URL: https://web.archive.org/web/20150530131818/http://www.eyespeakpro.com/assets/English/help/Understand%20Feedback.htm, retrieved on Feb. 5, 2016, the whole document.

International Preliminary Report on Patentability, dated Dec. 14, 2017, 11 pages.

European Patent Office Communication, Application No. 15 813 974.1, dated Jul. 17, 2019, 4 pages.

* cited by examiner

| Dynamic Lexical Element Zone | Text A | Audio A Fast | Audio A Slow |
|---|---|---|---|
| 1 | Native lexical element | Native auditory element | Native auditory element |
| 2 | Native lexical element | Native auditory element | Native auditory element |
| 3 | Native lexical element | Native auditory element | Native auditory element |
| 4 | Native lexical element | Native auditory element | Native auditory element |
| 5 | Native lexical element | Native auditory element | Native auditory element |
| 6 | Native lexical element | Native auditory element | Native auditory element |

| Text B | Audio B Fast | Audio B Slow |
|---|---|---|
| Secondary lexical element | Secondary auditory element | Secondary auditory element |
| Secondary lexical element | Secondary auditory element | Secondary auditory element |
| Secondary lexical element | Secondary auditory element | Secondary auditory element |
| Secondary lexical element | Secondary auditory element | Secondary auditory element |
| Secondary lexical element | Secondary auditory element | Secondary auditory element |

METHOD AND SYSTEM FOR LEARNING LANGUAGES THROUGH A GENERAL USER INTERFACE

CROSS-REFERENCE TO RELATED APPLICATIONS

This application is a non-provisional application claiming the benefit of the filing dates under 35 U.S.C. § 119(e) of Provisional Patent Application No. 61/997,694, filed Jun. 9, 2014 and Provisional Patent Application No. 61/997,696, filed Jun. 9, 2014.

FIELD OF THE INVENTION

The invention relates to a method and system of learning a language and, more particularly, to a method and system of learning a language through a general user interface employing touch sensitive displays sections to circulate through pictorial, textual, and audio presentations.

BACKGROUND

Providing pedagogical assistance through technological devices for people seeking to learn foreign languages is an area of technology that has been explored since computers developed sufficient multimedia capabilities to record and play a sound file which could be correlated to text or images displayed on the screen. Until now these capabilities have been underused. Computerized linguistic learning software has mainly been used to present traditional language-learning exercises in a digitized format, and has never fully harnessed the potential of the technology.

Now that mobile touchscreen computing devices are commonly available that contain speakers, microphones, and high definition visual displays, all of these can be leveraged to provide a more engaging method of learning a foreign language; creating a pedagogical immersion system that enables a language learner to more quickly and easily acquire proficiency in a new language.

SUMMARY

A language learning system is provided. The language learning system includes a computing device and a language learning file. The computing device includes a general user interface and a central processing unit. The language learning file is run by the central processing unit and includes multilingual data, a language display module, and a language learning module. The multilingual data includes a graphical constant element and dynamic lexical elements corresponding to the graphical constant element and having native language data and secondary language data translating from the native language data. The display module displays the graphical constant element and a native language element of the native language data through the general user interface in juxtaposed position. The language learning module switches between displays of the native language element with a secondary language element of the secondary language data.

BRIEF DESCRIPTION OF THE DRAWINGS

The invention will now be described by way of example with reference to the accompanying Figures of which:

FIG. 4 is a graphical representation of a relational database for the language learning system according to the invention;

DETAILED DESCRIPTION OF THE EMBODIMENT(S)

The invention will now be described in greater detail with reference to an embodiment including the attached figures.

A language learning system 1 according to the invention will be described through exemplary embodiments as shown in the Figures. The language learning system 1 employs software and hardware to review and convert between a native language and a secondary translation of the native language through a framework of pictorial images of non-linguistic contextual cues that work with the linguistic elements to enhance the user's understanding of lexical material as related to the native language and the translation into the secondary language.

Figure 1:
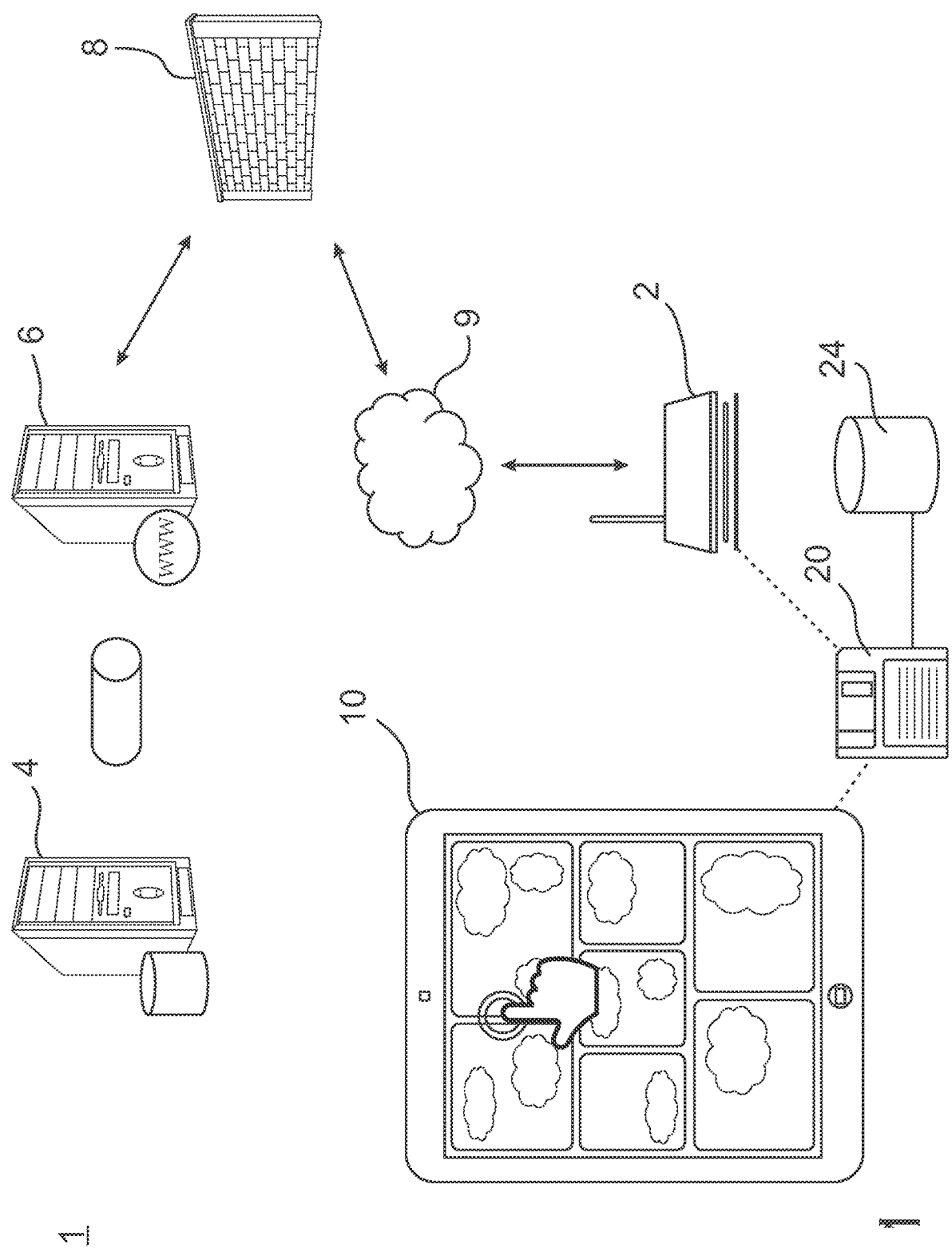
FIG. 1 is a flow diagram of hardware infrastructure for a language learning system according to the invention.

Referring first to FIG. 1, hardware infrastructure for an embodiment of the language learning system 1 will be described. In an exemplary embodiment, the language learning system 1 is built on a network router 2 (for instance, a wireless router) and connected to a database server 4, while also utilizing known hardware components, including a web server 6, a firewall 8, a network 9, and the computing device 10.

The language learning system 1 allows a user to access to a plurality of language learning files 20 that includes multilingual data 24, such as information and images, through the computing device 10 and a network traffic information on the database server 4 (i.e. SQLServer or WindowsServer2012 or newer) that connects to a web server 6. The web server 6 functions as a way for network router 2 to communicate to the database server 4 through an application-programming interface (API) between the computing device 10 and the database server 4. A firewall 8 is integrated for security purposes such as, but is not limited to, blocking unauthorized access to the web server 6 and permitting unauthorized communication thereto. The language learning system 1 is designed to run through the computing device 10 through the language learning files 20 that are downloaded over personal area networks (PANs), local area networks (LANs), campus area networks (CANs), wide area networks (WANs), metropolitan area networks (MANs) and any new networking system developed in the future. These networks are represented with the network 9. One skilled in the art should appreciate that the language learning system 1 can be maintained solely through the computing device 10, as the language learning files 20 can be pre-loaded to the computing device 10. In the shown embodiment, the user connects to the network router 2 using the computing device 10 through the network 9.

Figure 2:
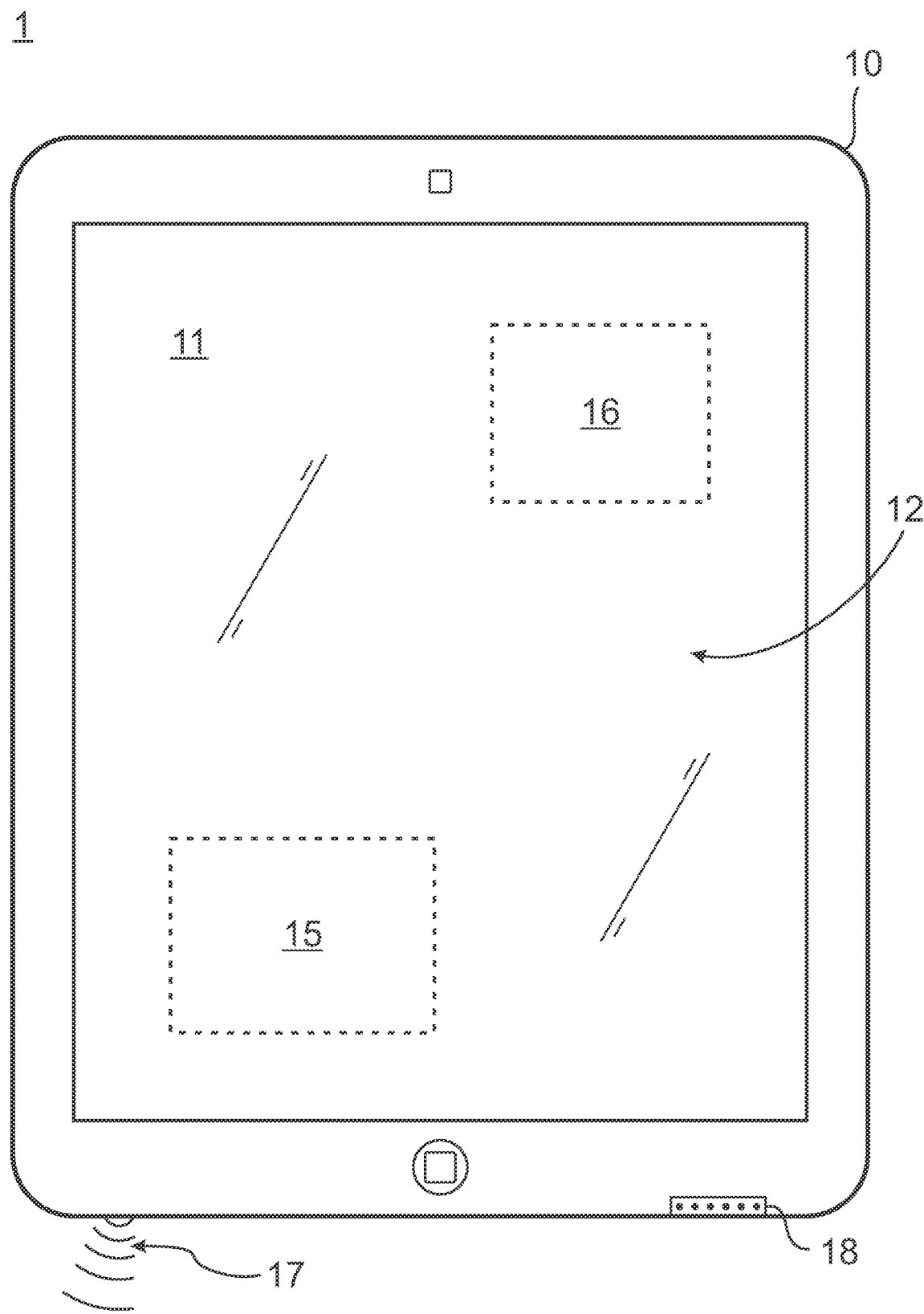
FIG. 2 is a schematic diagram of a connection device of the language learning system according to the invention.

With reference to FIG. 2, the computing device 10 will be described. The computing device 10 generally includes a general user interface 12, a memory device 15, and a processor 16. In the shown embodiment, the computing device 10 is a tablet computer with a touchscreen display 11. The computing device 10 includes sensors, including an audio output device 17 and an audio input device 18. The audio output device 17 may be a speaker or an audio jack, while the audio input device 18 may be an internal microphone. The touchscreen display 11 uses finger or stylus gestures to navigate the general user interface 12. However, one skilled in the art should appreciate that other implements could be used; including a computer mouse, a keyboard, or joystick. In fact, one skilled in the art should appreciate that the computing device 10 is a physical computer and could be, but not limited to, a desktop computer, a laptop computer, or a cell phone. The memory device 15 is a storage device having computer components and recording media used to retain digital data. The processor 16 is a central processing unit (CPU) that manipulates data stored in the memory device 15 by performing computations.

Figure 3:
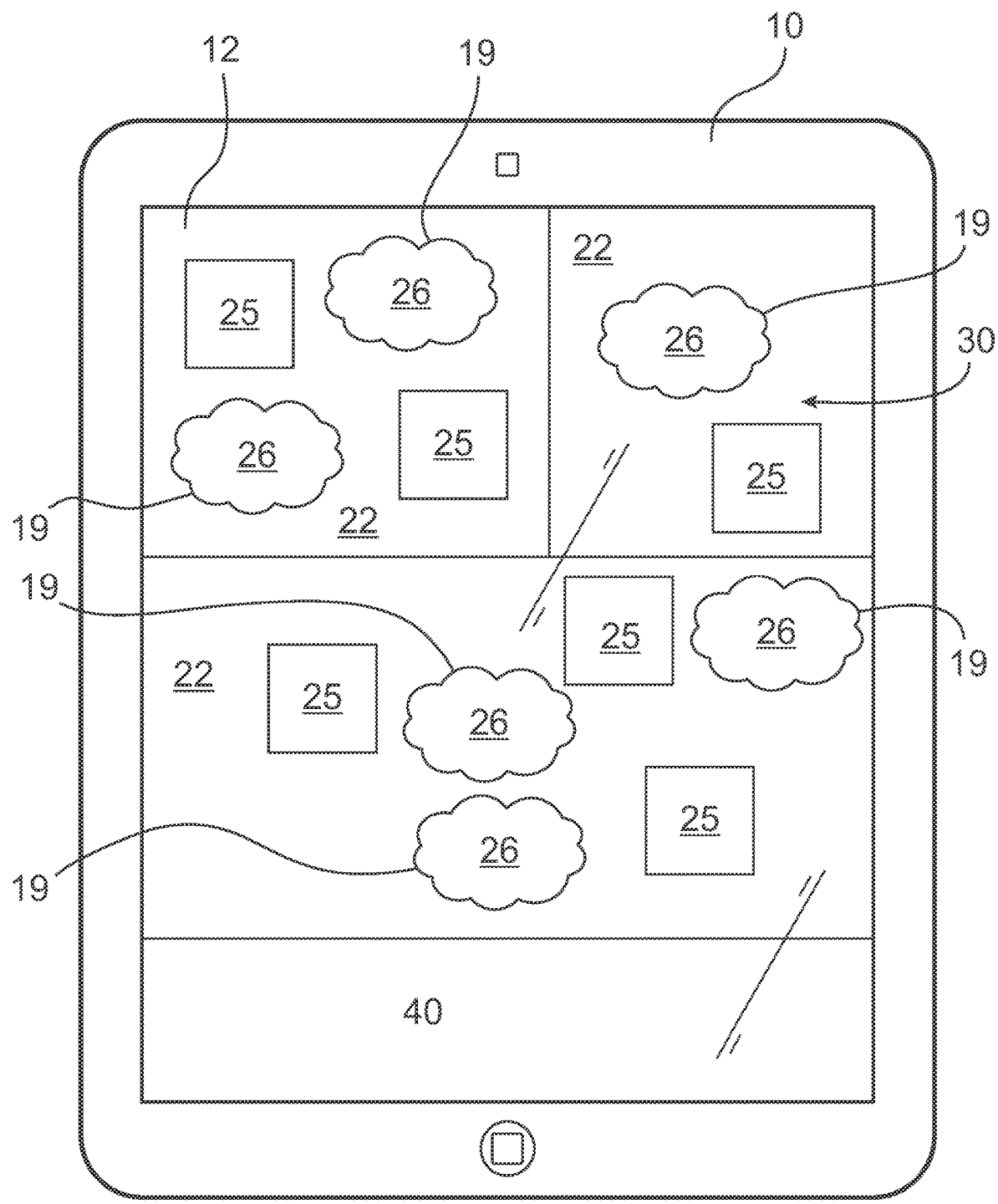
FIG. 3 is a graphical representation of a language display module and a language learning module of the language learning system according to the invention showing a general user interface having a plurality of sequential juxtaposed panels.
Figure 5:
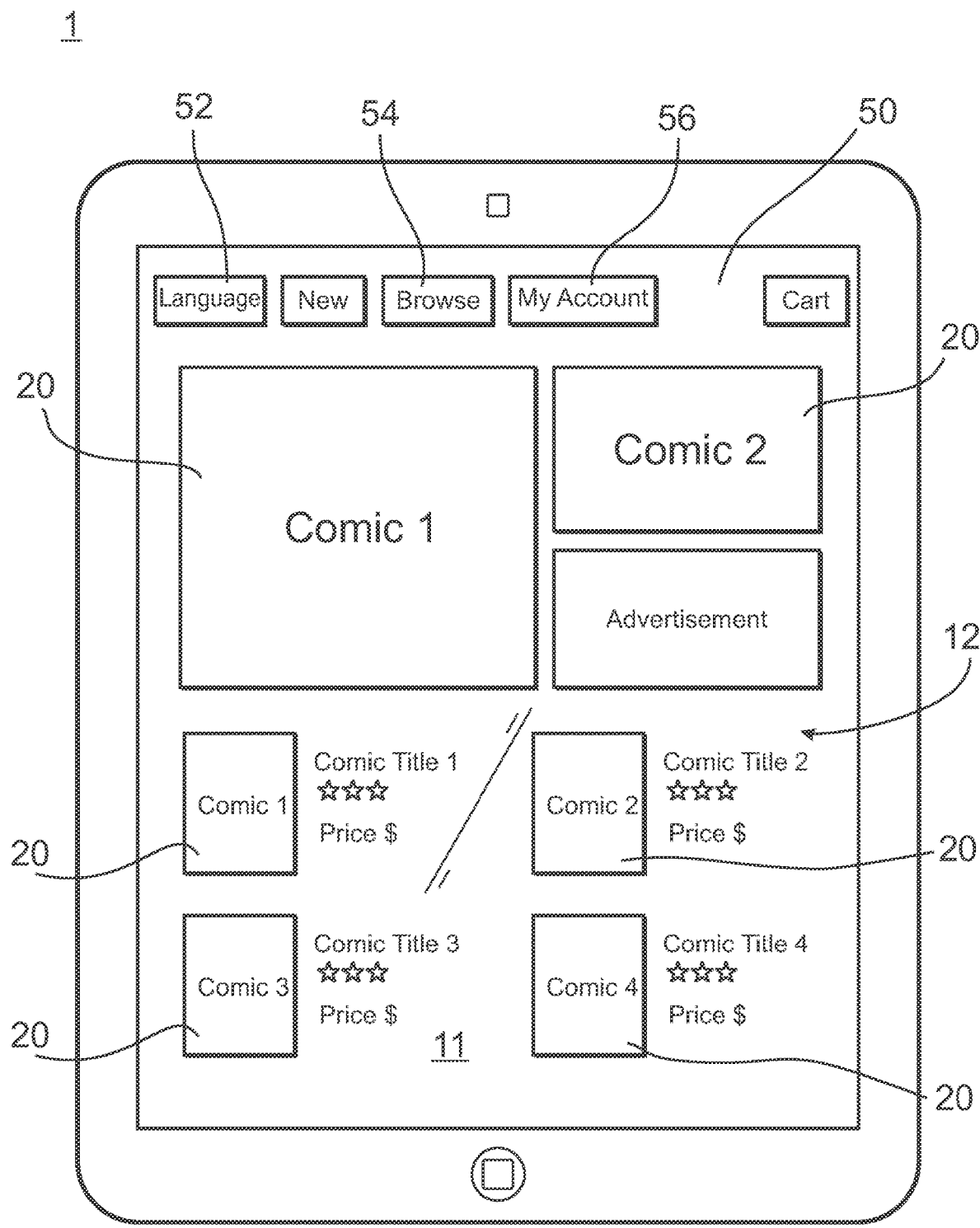
FIG. 5 is a graphical representation of a learning language management application of the language learning module according to the invention.

With reference to FIG. 3, the language learning file 20 will be described by way of illustration of the general user interface 12 for the computing device 10.

The language learning file 20 includes a sequence of instructions, which is written to perform a specified tasks to display, and generally includes a language display module 30 and a language learning module 40. The language learning file 20 further includes multilingual data 24, including graphical constant elements 25, dynamic lexical elements 26, and auditory elements 27. In particular, the language display module 30 displays graphical constant elements 25 and dynamic lexical elements 26 through the general user interface 12, while the language learning module 40 switches a display of the dynamic lexical elements 26 between native language data and secondary language data that is a translation of the native language data. The language learning module 40 also performs auditory function by broadcasting auditory elements 27 corresponding to the native language data and secondary language data.

As shown in FIG. 4, the multilingual data 24, including native language data and secondary language data, is stored in relational databases. These relational databases include data elements listed in related tables that match up to links that are identified as zones 19 in FIG. 3. These zones 19 correspond to coordinates along the general user interface 12. As shown in FIG. 3, an example of how the multilingual data 24 associated with each zone 19 could be stored in a database, using the index key to identify which zone's data is utilized by the language learning module 40, and the various other elements associated with the index key can be called up to either fill the text zone with text in the desired language, or cause the device to play an audio recording of the text being spoken as will be described later.

Now with reference to FIGS. 5-10, access to language learning files 20 of the language learning system 1 will be described by way of an exemplary embodiment of a learning language management application 50.

In the shown embodiment, the learning language management application 50 is an app based computer program stored on the database server 4 and accessed by the computing device 10 over a network 9 and through the web server 6 and the firewall 8. The learning language management application 50 allows the user to create an account to play, download, and organize the purchased language learning file 20 on the computing device 10. The learning language management application 50 provides various language learning files 20 for purchase and download. In the shown embodiment, each language learning file 20 includes a publication in digital form, consisting of text, images, an audio, readable on computers or other electronic devices, and corresponding to the graphical constant elements 25, the dynamic lexical elements 26, and the auditory elements 27 of the multilingual data 24, respectively.

Figure 6:
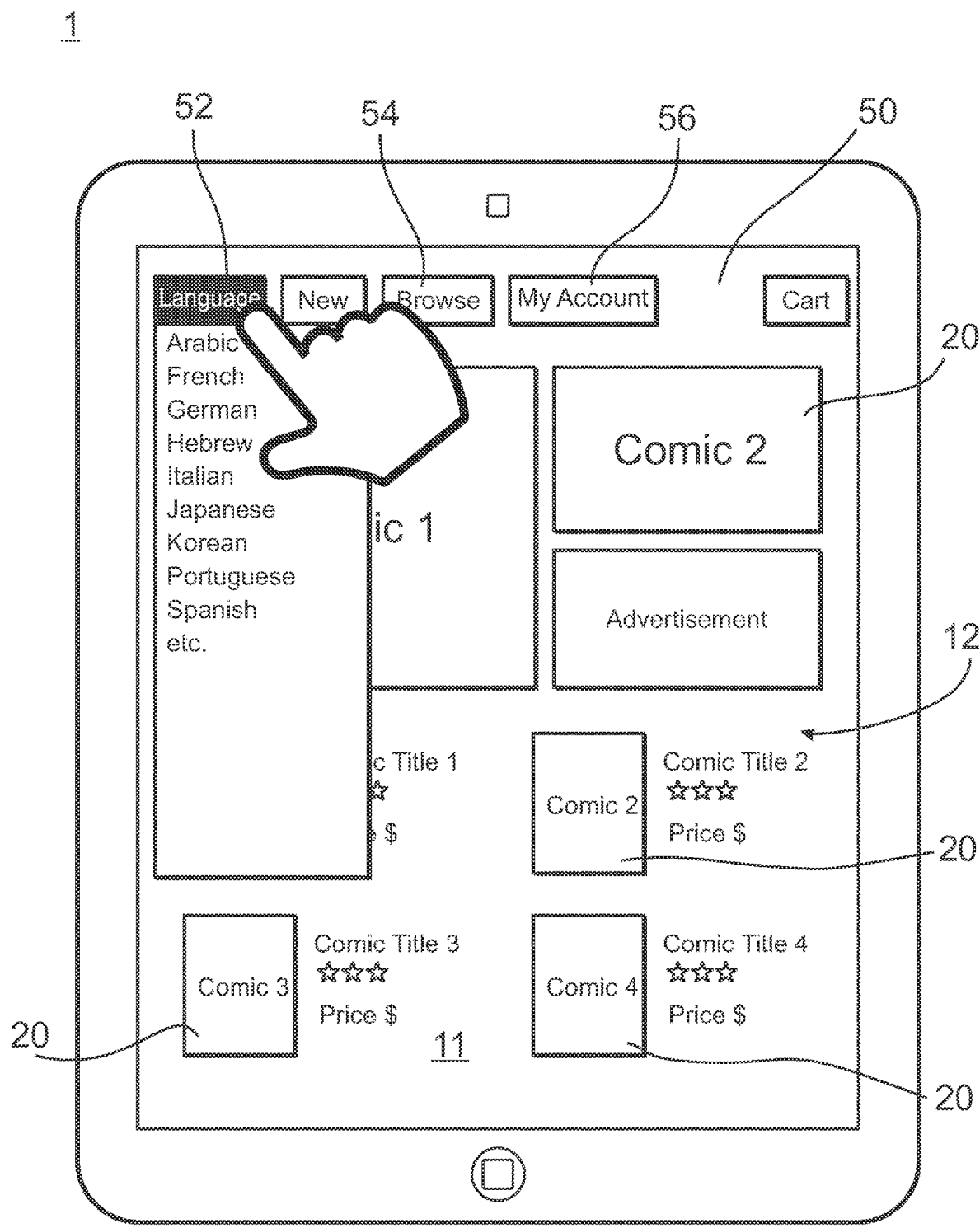
FIG. 6 is a graphical representation of a language listing module of the learning language management application of FIG. 5.
Figure 7:
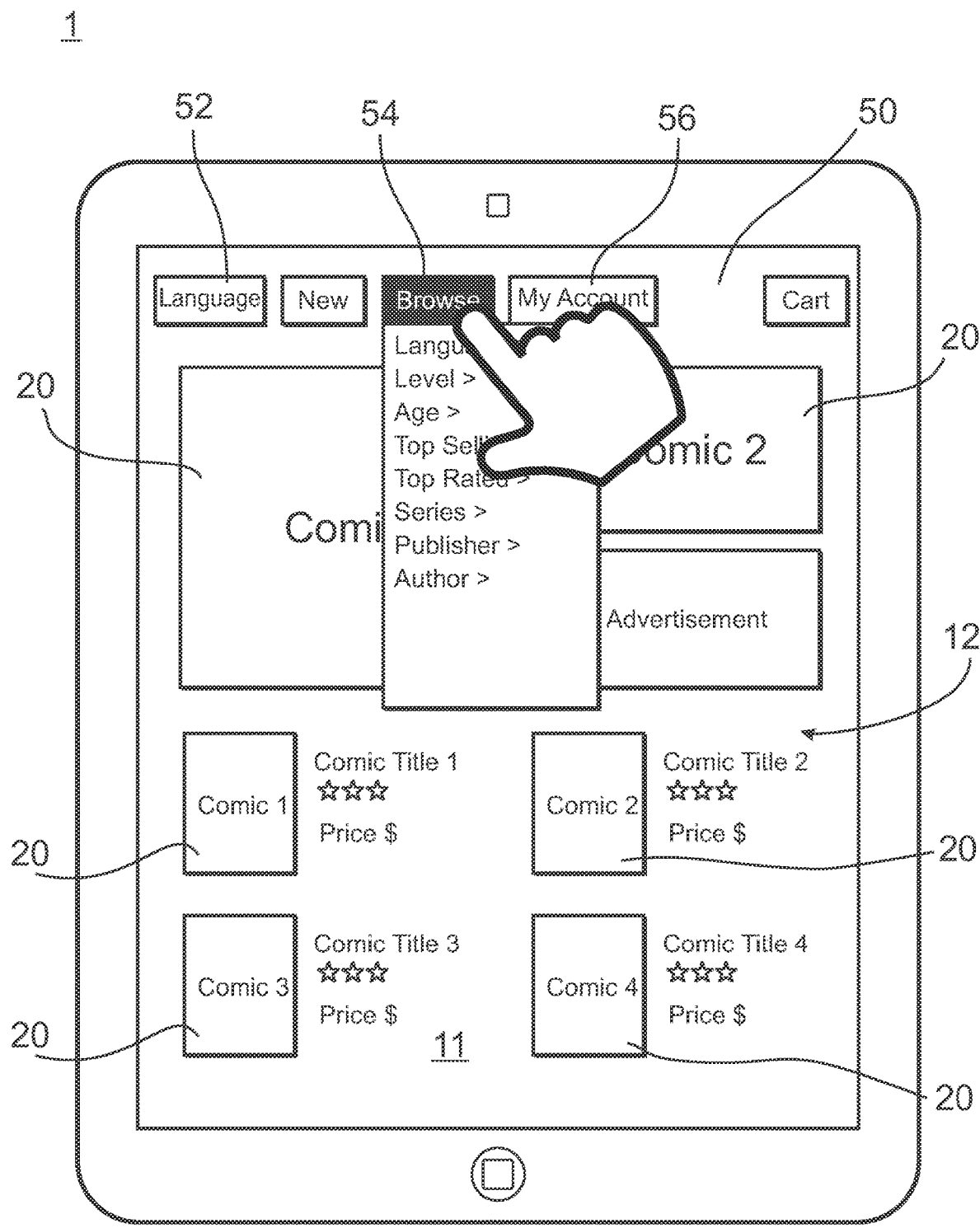
FIG. 7 is a graphical representation of a file browse module of the learning language management application of FIG. 5.

As shown in FIG. 6, the learning language management application 50 provides various language learning files 20 providing text and audio files in different native languages and secondary languages corresponding to from the native language. Accordingly, the learning language management application 50 allows the user to sort through language learning files 20 by native language or secondary language using a language listing module 52. A shown in FIG. 3, the learning language management application 50 also includes a file browse module 54 to sort through accessible language learning files 20.

Figure 8:
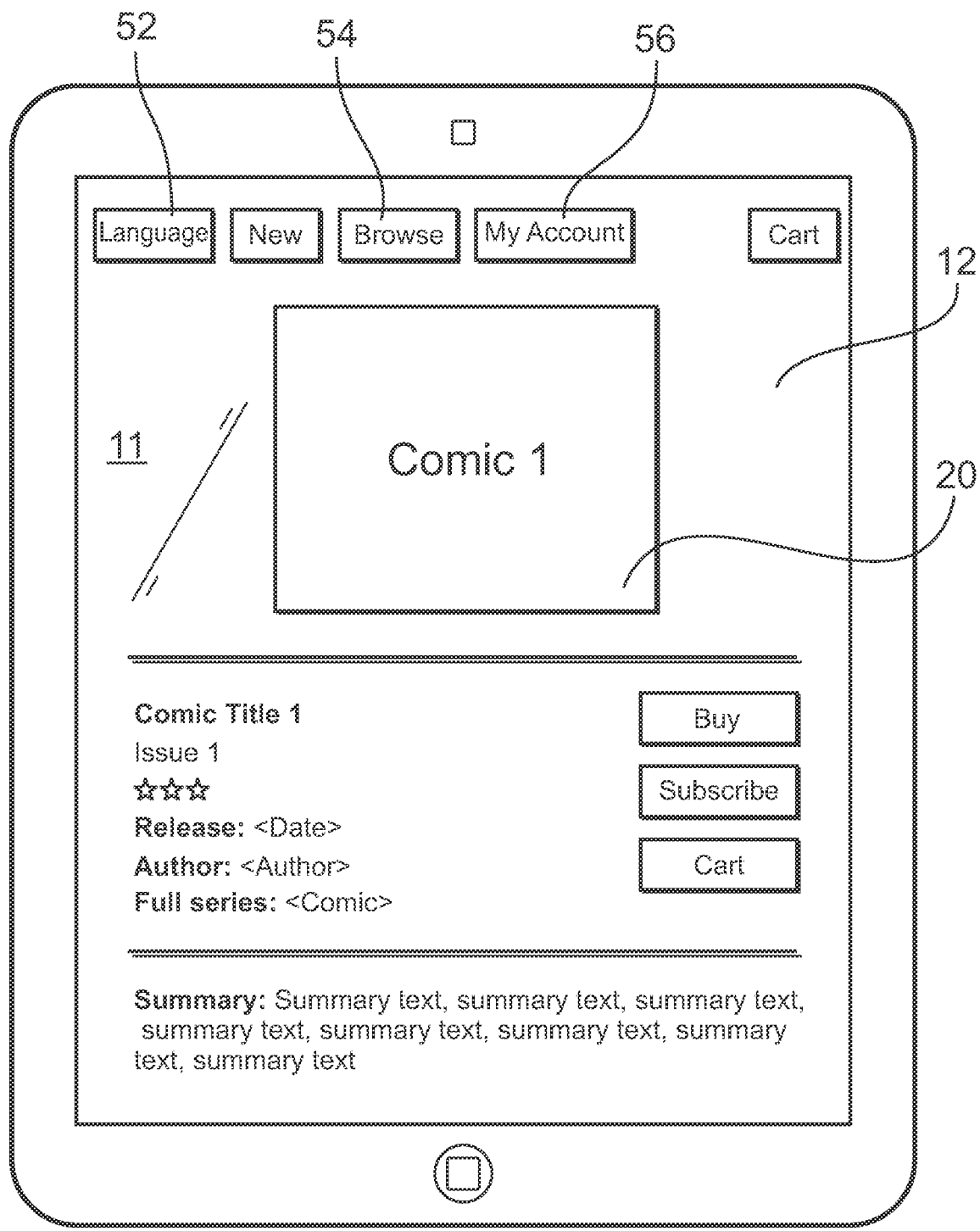
FIG. 8 is another graphical representation of the learning language management application of FIG. 5.
Figure 9:
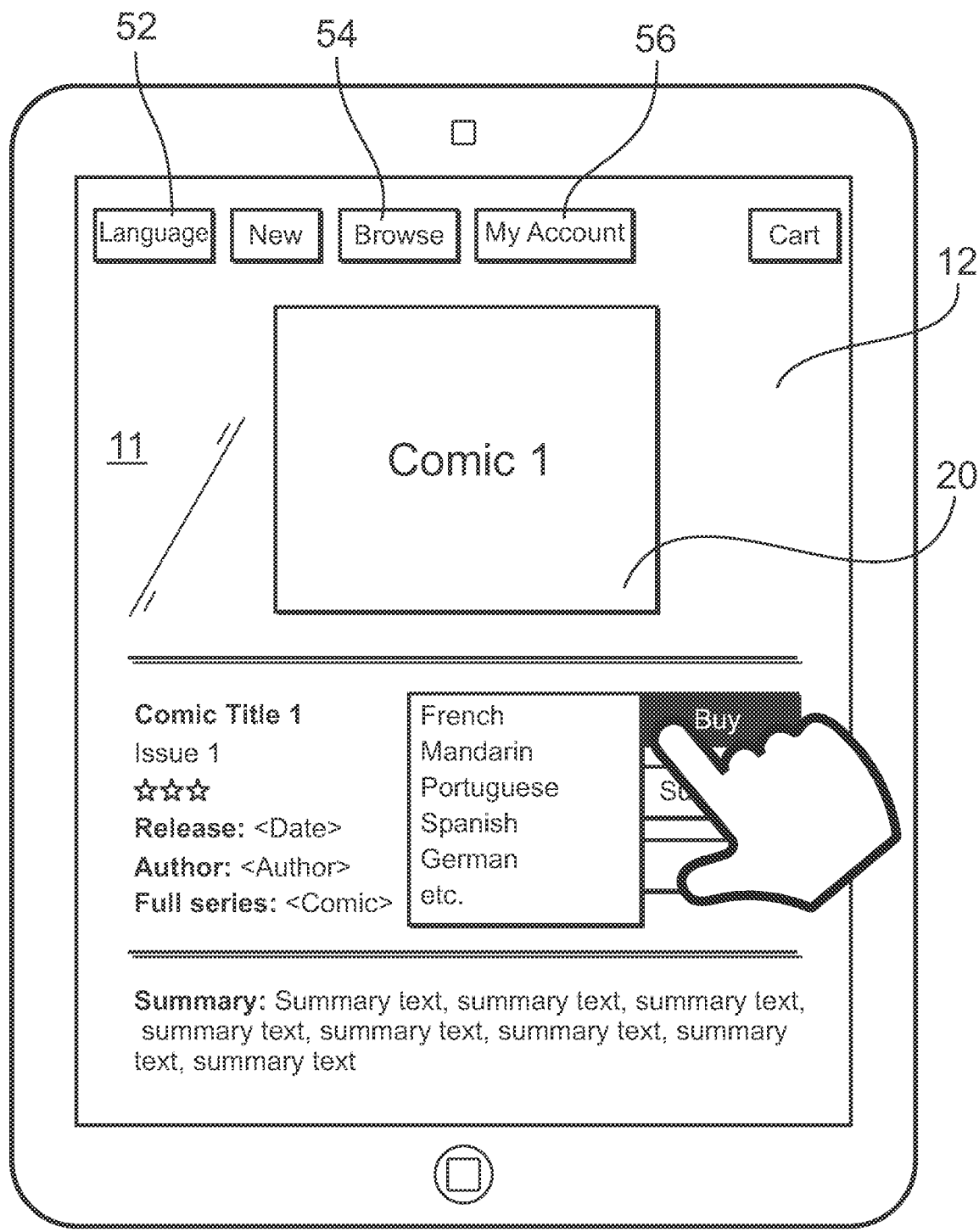
FIG. 9 is another graphical representation of the learning language management of FIG. 5.
Figure 10:
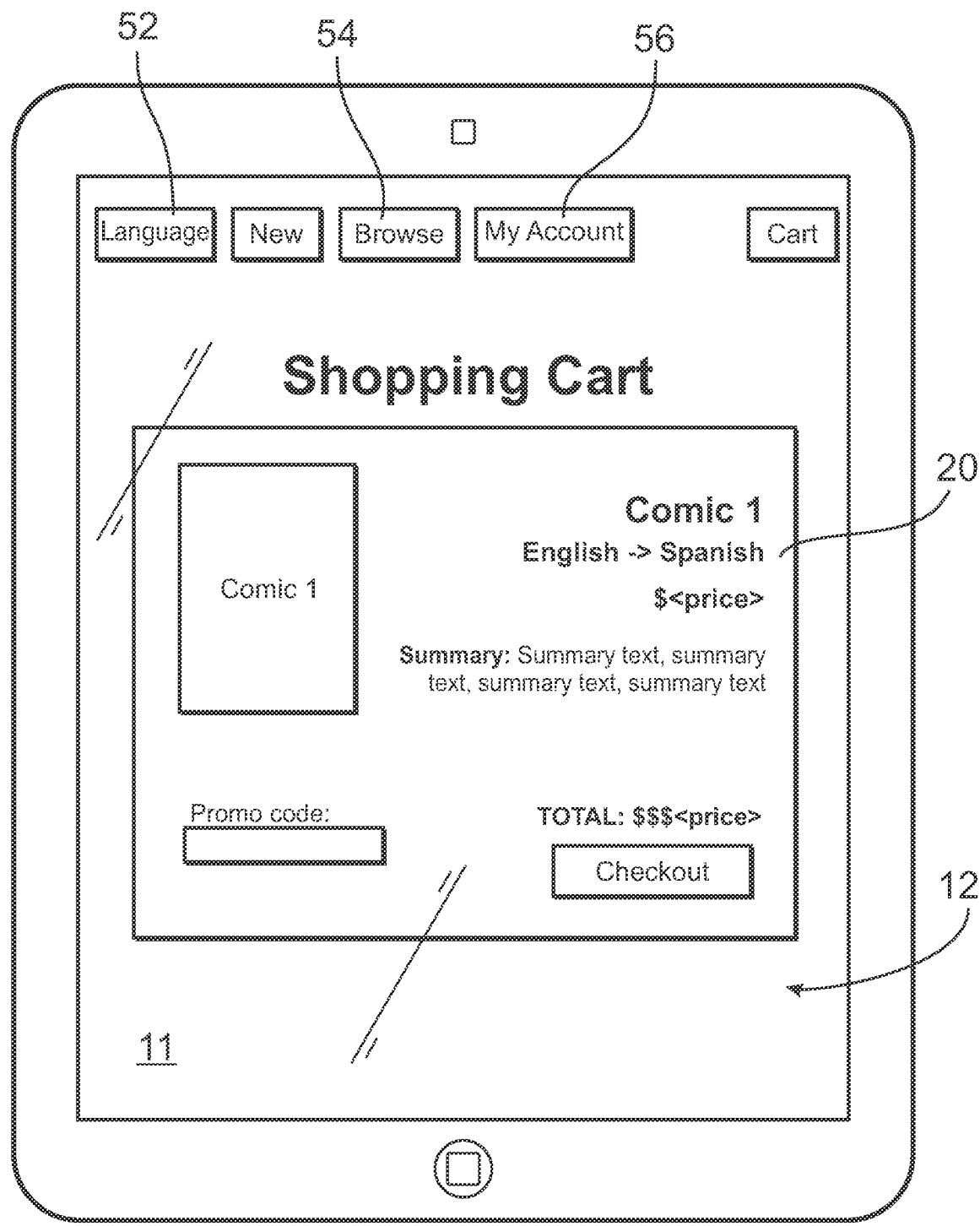
FIG. 10 is another graphical representation of the learning language management of FIG. 5

As shown in FIG. 8-10, the user selects and purchases a language learning file 20 of choice. The language learning file 20 then is available for use through the language learning system 1. In the shown embodiment, the learning language management application 50 includes an account module 56 that stores language learning files 20 for use by the user in a storage file (not shown). This storage file is personal to the user and includes all language learning files 20 that the user may have purchased or accessed, as well as other account information and saved data that the user selects (which will be described in greater detail below).

Now with reference to FIGS. 11-16, the language learning system 1 will be described through the computing device 10 running a selected language learning file 20 with a language display module 30 and a language learning module 40. In general, using the computing device 10, a user selects the language learning file 20 to review and interact with a publication of multilingual data 24 displayed on the general user interface 12. In particular, as shown in FIG. 12, the language display module 30 pulls multilingual data 24, and displays graphical constant elements 25 and dynamic lexical elements 26 from the multilingual data 24 through the general user interface 12. In the shown embodiment, the language learning file 20 is an electronic publication and, more particularly, a comic book's with artwork provided through a touchscreen display 11 of the computing device 10. The user can move from page to page using a finger or stylus. However, one skilled in art should appreciate that other genres of works are possible, include science fiction, drama, action, romance, mystery, horror, self-help, guides, children's, poetry, history, educational, biographies, autobiographies, etc.

Figure 11:
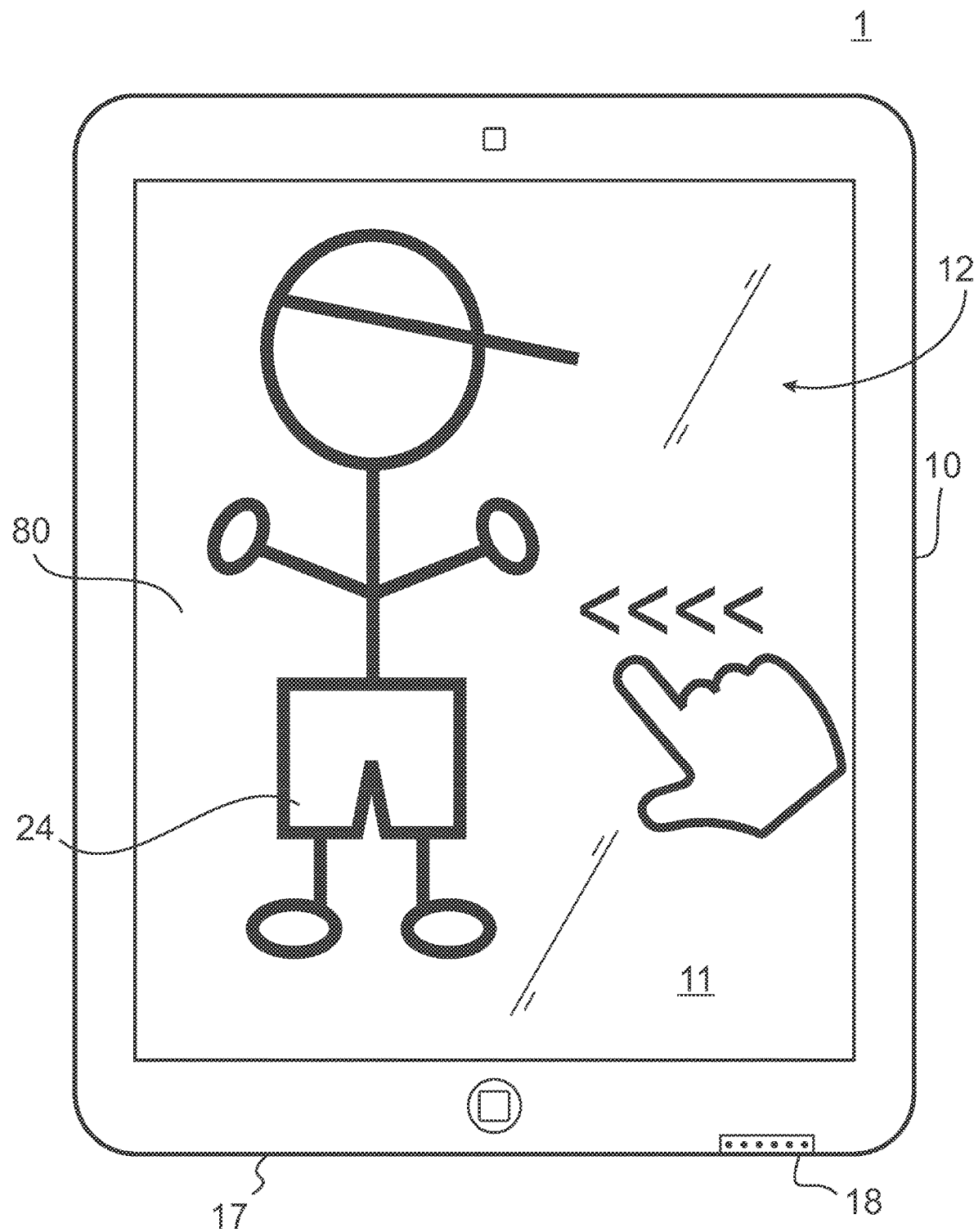
FIG. 11 is a graphical representation of the language learning system according to the invention showing a general user interface displaying data from a language learning file.
Figure 12:
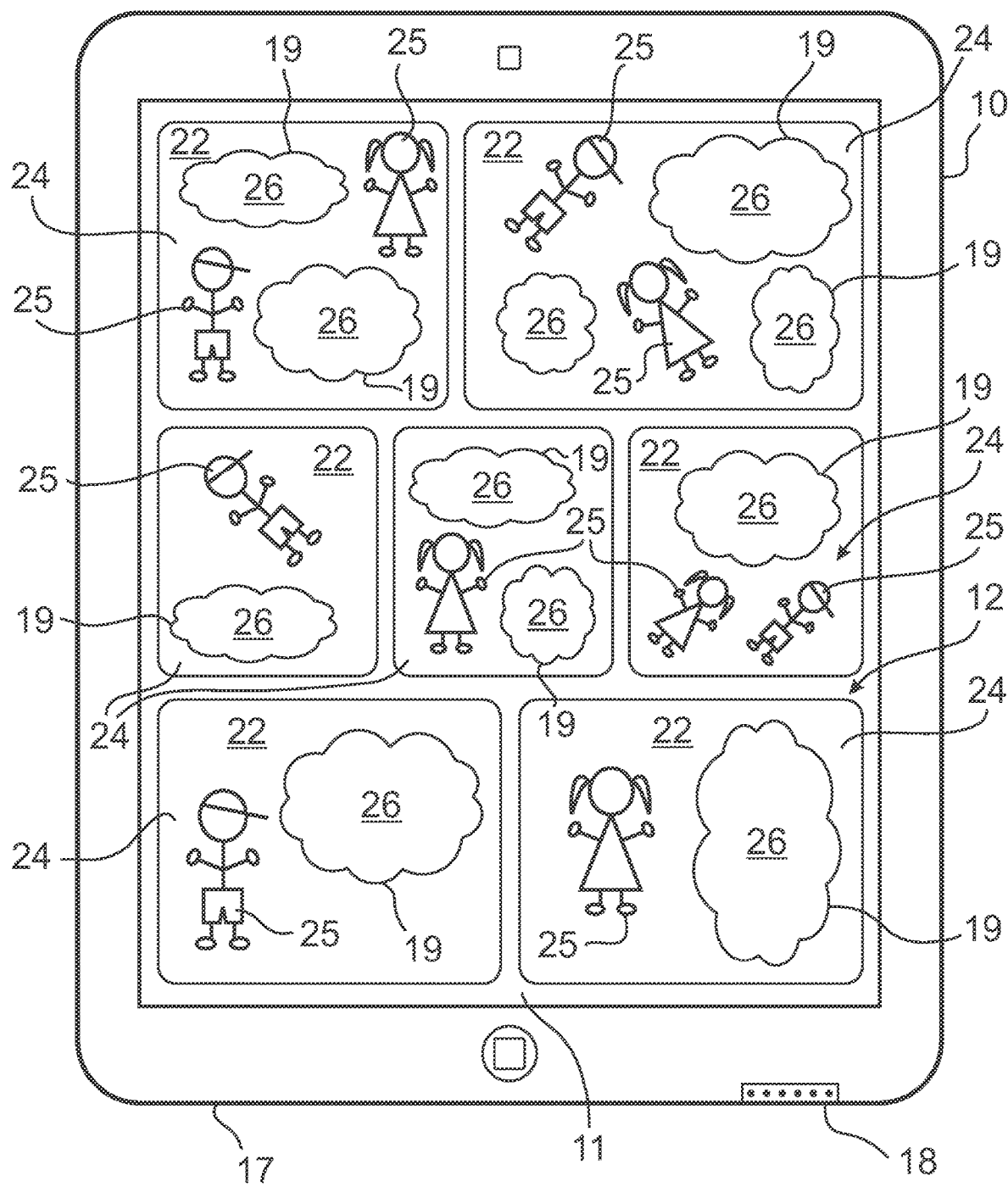
FIG. 12 is a graphical representation of a language display module and a language learning module of the language learning system according to the invention showing a general user interface having a plurality of sequential juxtaposed panels.

As shown in FIG. 11, in an exemplary embodiment, each page of the electronic publication includes a plurality of sequential juxtaposed image panels 22 portraying a scene and the characters within it, as well as dynamic lexical elements. The graphical constant elements 25 are pictorial displays of individual images containing a segment of action. Furthermore, in the shown embodiment, the dynamic lexical elements 26 is display of text (i.e. plain or stylized) depicting dialogue, narration, sound effects, or other information relating to the graphical constant elements 25. The zones 19 (also shown in FIG. 3) correspond to coordinates representing an area of dynamic lexical elements 26 provided in sections of the general user interface 12. As shown, each zone 19 is a caption section, such as a caption balloon. However, one skilled in the art should appreciate that the zone 19 need not be shown by a physical boundary (i.e. caption balloon), but is otherwise associated with specific coordinates along the general user interface 12. According to the invention, the dynamic lexical elements 26 include both native language elements 26a and secondary language elements 26b that are translated from respective native language elements 26a.

With reference to FIG. 12, the language learning module 40 allows the user to select a native language element 26a within a selected zone 19 and receive a translation of that selected native language element through a display of the secondary language element 26b, as well as auditory elements 27. The auditory elements 27 include both native auditory elements 27a corresponding to the native language elements 26a and secondary auditory elements 27b that translate from a selected native language element 26a.

Figure 13:
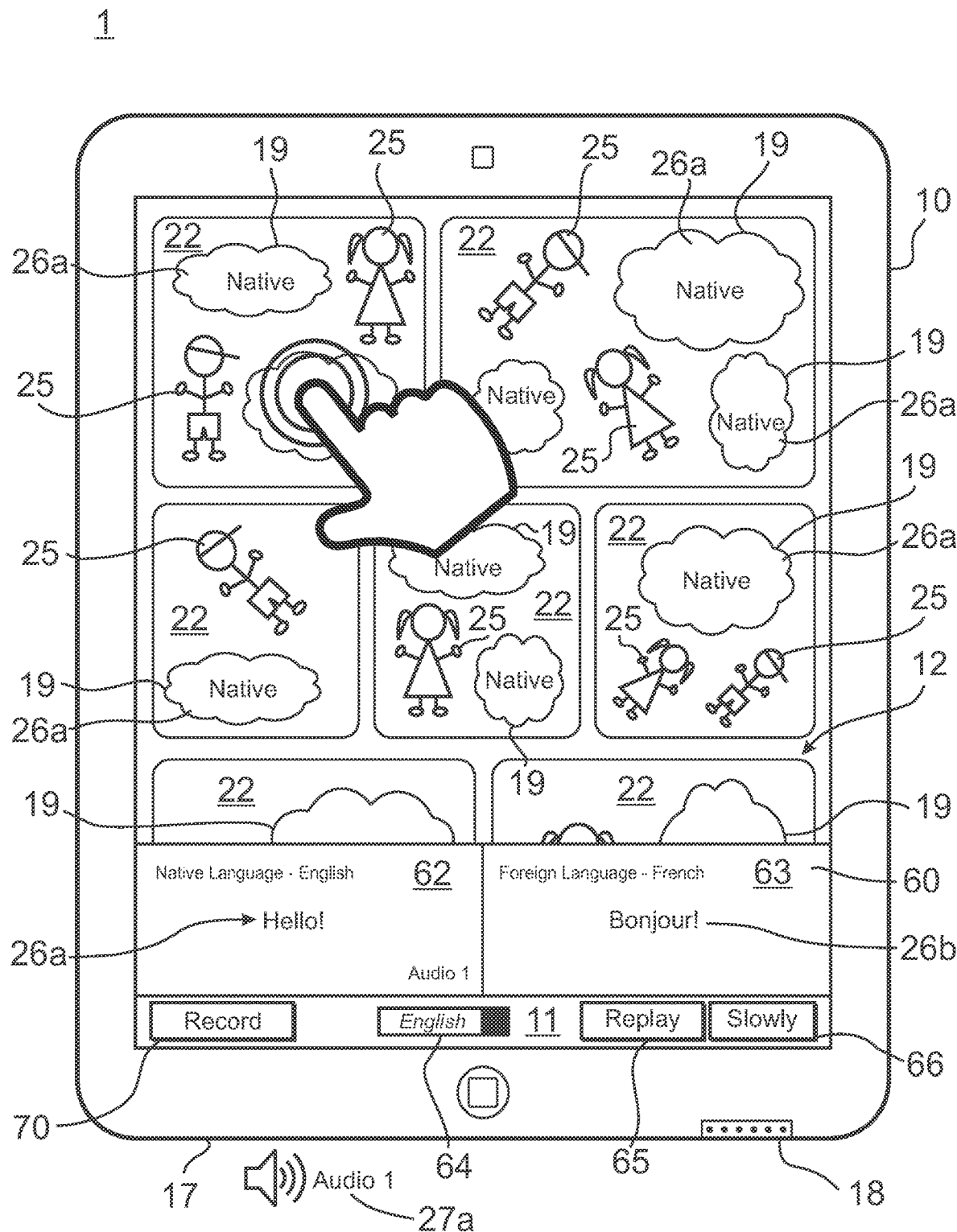
FIG. 13 is a graphical representation of the language display module and the language learning module of FIG. 12 showing a native language display section.

With reference to FIG. 13, when the user initiates interaction with a lexical element in zone 19 by touching it, the language learning module 40 will operate on the data in the relational database that relates to that particular lexical element (i.e. native language elements 26a and secondary language elements 26b). In the shown embodiment, the user selects a native language element 26a in a selected zone 19 and a translation interaction module 60 is provided and includes a native language display section 62, a secondary language display section 63, a translate module 64, a replay module 65, a auditory speed module 66, and an audio wave-form analysis module 70

The translation interaction module 60 displays the native language element 26a in the native language display section 62 that has been selected by the user. The translation interaction module 60 also provides a translation of the of the native language element 26a through a display of the secondary language element 26b in the secondary language display section 63. In the shown embodiment, the secondary language element 26b is provided as a secondary language to the user, such as French.

Each native language element 26a is mapped to a corresponding secondary language element 26b stored in the relational databases (as described above) so that content of the native language element 26a is provide with a translation of the selected dynamic lexical element into a target language (i.e. foreign language).

As discussed above, each dynamic lexical element, a native language element 26a or secondary language element 26b, is linked to a plurality of audio files providing sound recordings of the dynamic lexical elements in the user's native language, as well as a second language. In particular, each native auditory element 27a is linked to the native language elements 26a by way of the relational database. When the user selects the native language element 26a in a selected zone 19, the corresponding native auditory element 27a is announced. Likewise, each secondary auditory element 27b is linked to the secondary language element 26b in the relational database and translates from the selected native language element 26a. When the user selects the native language display section 62 or a secondary language display section 63 through gesture recognition (i.e. finger touch), the native auditory element 27a or the secondary auditory element 27b is broadcast through the connection device. This allows the user to exchange between recordings of the native auditory element 27a or the secondary auditory element 27b.

In an embodiment shown in FIG. 13, native language elements 26a are populated in the zones 19 of each sequential juxtaposed image panel 22 that include scenes showing graphical constant elements 25. The native language elements 26a match up to the graphical constant elements 25 to which they are matched in the sequential juxtaposed image panel 22. Upon touch interaction with one of the zones 19, the language learning module 40 automatically plays an audio track (at conversational speed) of the native language element 26a, the native auditory element 27a associated with the native language elements 26a underlying the zone 19 selected by the user. The native language element 26a selected by the user is then displayed in the native language display section 62 of the translation interaction module 60. Likewise, the secondary language element 26b is displayed in the secondary language display section 63 of the translation interaction module 60. The user can repeat the native auditory element 27a by selecting the replay module 65, or by continued selection of the same zone 19. In the shown embodiment, the secondary language element 26b is provided as a secondary language to the user, such as French. The auditory speed module 66 allows the user to change the speed at which the native auditory element 27a is broadcast (e.g. slowly, quickly, etc.). The user selects the auditory speed module 66 and the language learning module 40 modifies the broadcast.

Figure 14:
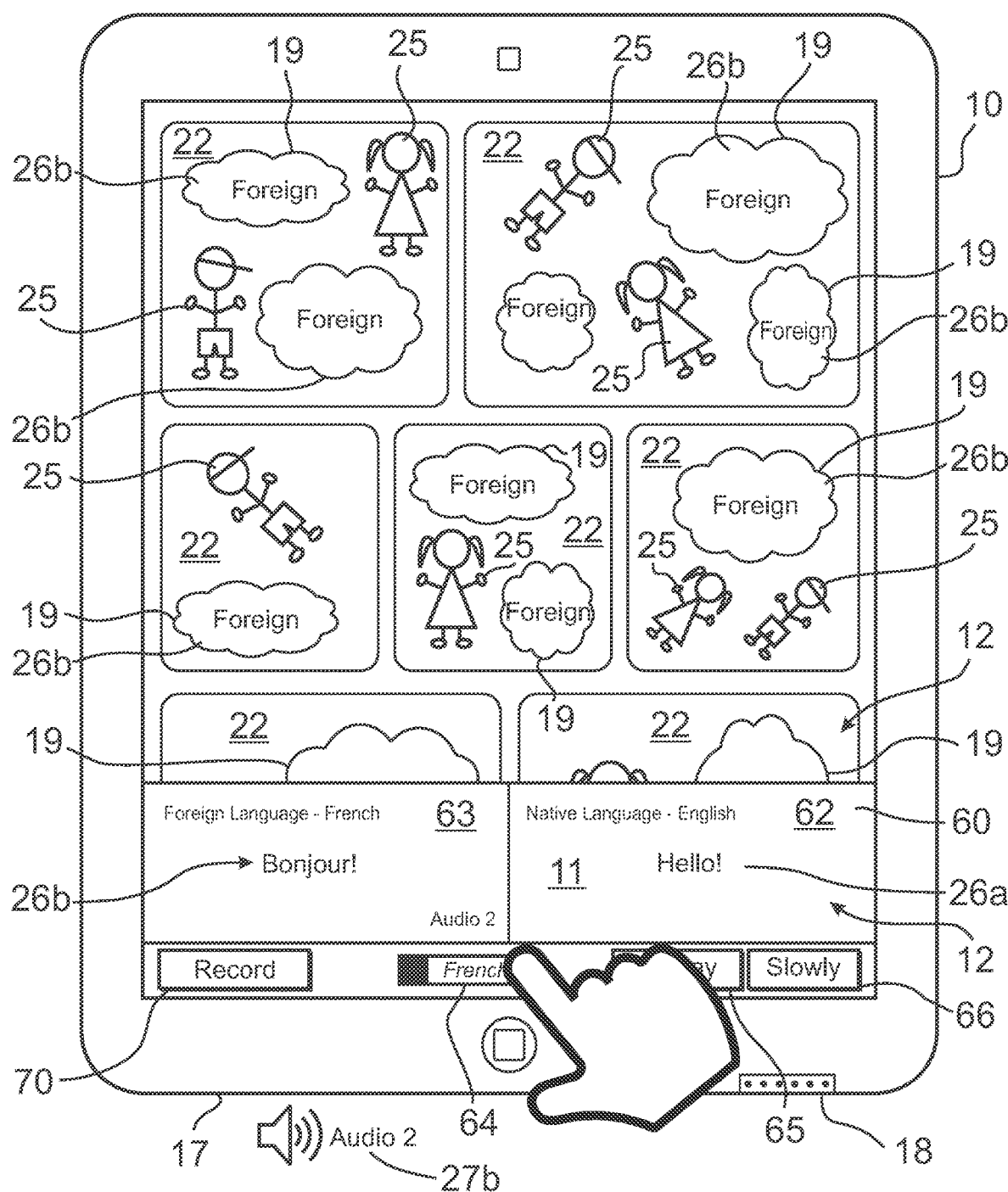
FIG. 14 is another graphical representation of the language display module and the language learning module of FIG. 12 showing a secondary language display section.

With reference to FIG. 14, the translation interaction module 60 further includes the translate module 64 which switches the display of the text in each zone 19 from one language to another in each of the sequential juxtaposed image panels 22. As shown, the native language display section 62 and the secondary language display section 63 switch in the translation interaction module 60. More particularly, in the shown embodiment, the secondary language elements 26b are populated in the zones 19 of each sequential juxtaposed image panel 22 that include scenes showing graphical constant elements 25. The secondary language elements 26b match up to the graphical constant elements 25 to which they are matched in the sequential juxtaposed image panel 22. Upon touch interaction with one of the zones 19, the language learning module 40 automatically plays an audio track (at conversational speed) of the secondary language element 26b, the secondary auditory element 27b is associated with the secondary language element 26b and the native language elements 26a underlying the zone 19 selected by the user. The secondary language element 26b selected by the user is then displayed in the secondary language display section 63 of the translation interaction module 60. Likewise, the native language element 26a is displayed in the native language display section 62 of the translation interaction module 60, and positioned adjacent to the secondary language display section 63 for user comparison. Again, the user can repeat the secondary auditory element 27b by selecting the replay module 65, or by continued selection of the same zone 19. Again, the user can select the auditory speed module 66 to change the broadcast speed of the secondary auditory element 27b (e.g. slowly, quickly, etc.). If the user selects the translation interaction module 60 again, the translate module 64 again switches the display of the text in each zone 19 from one language to another in each of the sequential juxtaposed image panels 22. It is possible in other embodiments that the user can select from multiple languages stored in the multilingual data 24 of a selected a language learning file 20.

Figure 15:
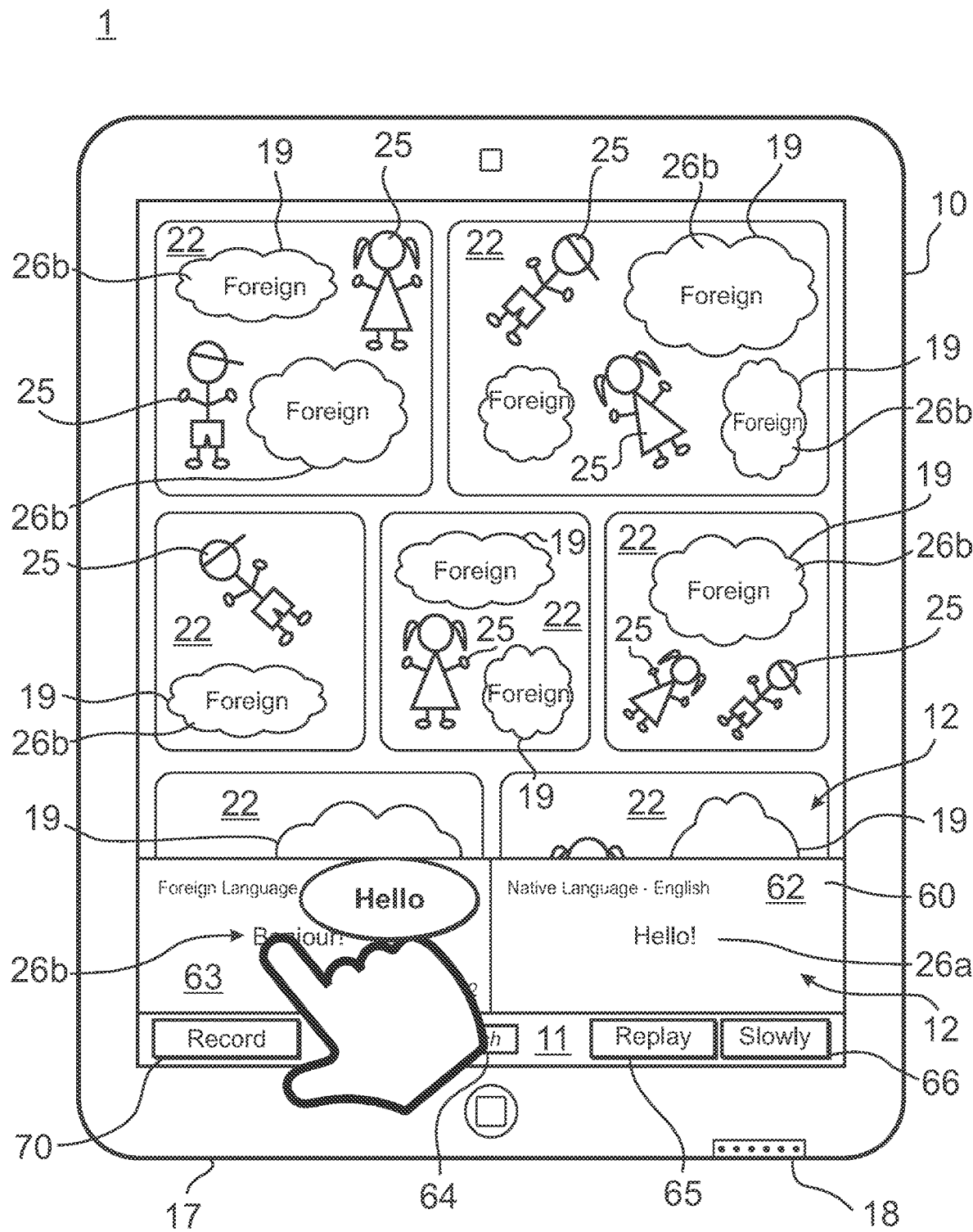
FIG. 15 is another graphical representation of the language display module and the language learning module of FIG. 14 showing a translation window.

A shown in FIG. 15, the user can hover over the secondary language display section 63, or the native language display section 62, and a translation of the secondary language element 26b or the native language elements 26a will be displayed adjacent to the secondary language element 26b or the native language elements 26a shown in the translation interaction module 60. For instance, in the shown embodiment, the user hovers a finger over the secondary language element 26b displayed in the secondary language display section 63. The language learning module 40 then displays a translation window 63b appears with the corresponding native language elements 26a displayed.

Figure 16:
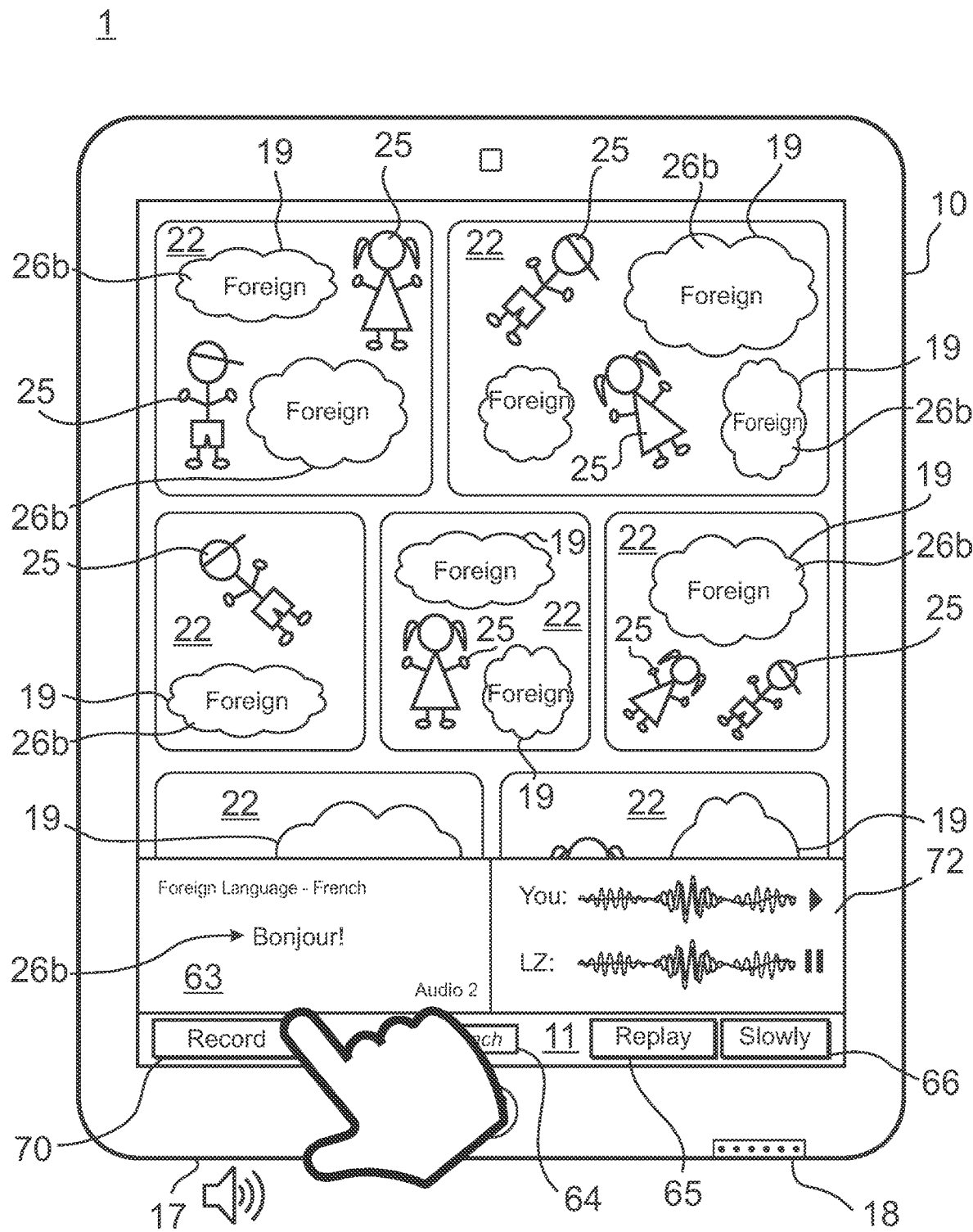
FIG. 16 is another graphical representation of the language display module and the language learning module of FIG. 14 showing an audio wave-form analysis module.

Now with reference to FIG. 16, the audio wave-form analysis module 70 will be described. In particular, the audio wave-form analysis module 70 allows the user to select a particular audio recording associated with a selected zone 19, a native auditory element 27a or a secondary auditory element 27b, and make a recording through the audio input device 18 of the computing device 10. The recording is the user's attempt to mimic the proper pronunciation of the native auditory elements 27a or the secondary auditory elements 27b broadcast by the language learning module 40. The audio wave-form analysis module 70 then displays audio window 72 that graphically displays the user's mimicry as compared to the proper pronunciation of the native auditory element 27a or the secondary auditory element 27b. The audio wave-form analysis module 70 will permit the user to determine the degree of accuracy of the user's pronunciation in relation to the proper pronunciation of the native auditory element 27a or the secondary auditory element 27b. In an embodiment of the invention, the audio wave-form analysis module 70 will also perform an analysis of the recorded content for a degree of closeness/match with the original content pronunciation of the native auditory element 27a or the secondary auditory element 27b. The audio wave-form analysis module 70 will then assign a score to the recording based on the outcome of the analysis.

In another embodiment of the invention, when a zone 19 is selected, an interactive box will be displayed that includes pedagogical information that has been included within the associated metadata of the native language elements 26a or the secondary language element 26b. This may include an explanation of a translation's idiomatic meaning or other information of educational significance related to the particular text and its translation.

Now with reference to FIGS. 17-26, a gesture selection module 80 for the language learning system 1 will be described. For the sake of brevity, only those features that differ from the language learning system 1 discussed above will be described, while like components will be omitted from discussion.

In general, the gesture selection module 80 provides a system and method for user to select one or more distinct objects, such as the dynamic lexical elements 26, displayed in the zones 19 by means of a circular gesture. The gesture selection module 80 selects the one or more distinct objects, for instance, and stores that content in a user personal file or account for subsequent review. In the shown embodiment, the user selects one or more dynamic lexical elements 26 from the general user interface 12 of the computing device 10, and the gesture selection module 80 stores information concerning the dynamic lexical elements 26 in a user personal account using the account module 56 of the learning language management application 50. However, one skilled in the art should appreciate that the gesture selection module 80, discussed in more detail below, could be used with other systems requiring a user to select and store information displayed on a general user interface 12.

Figure 17:
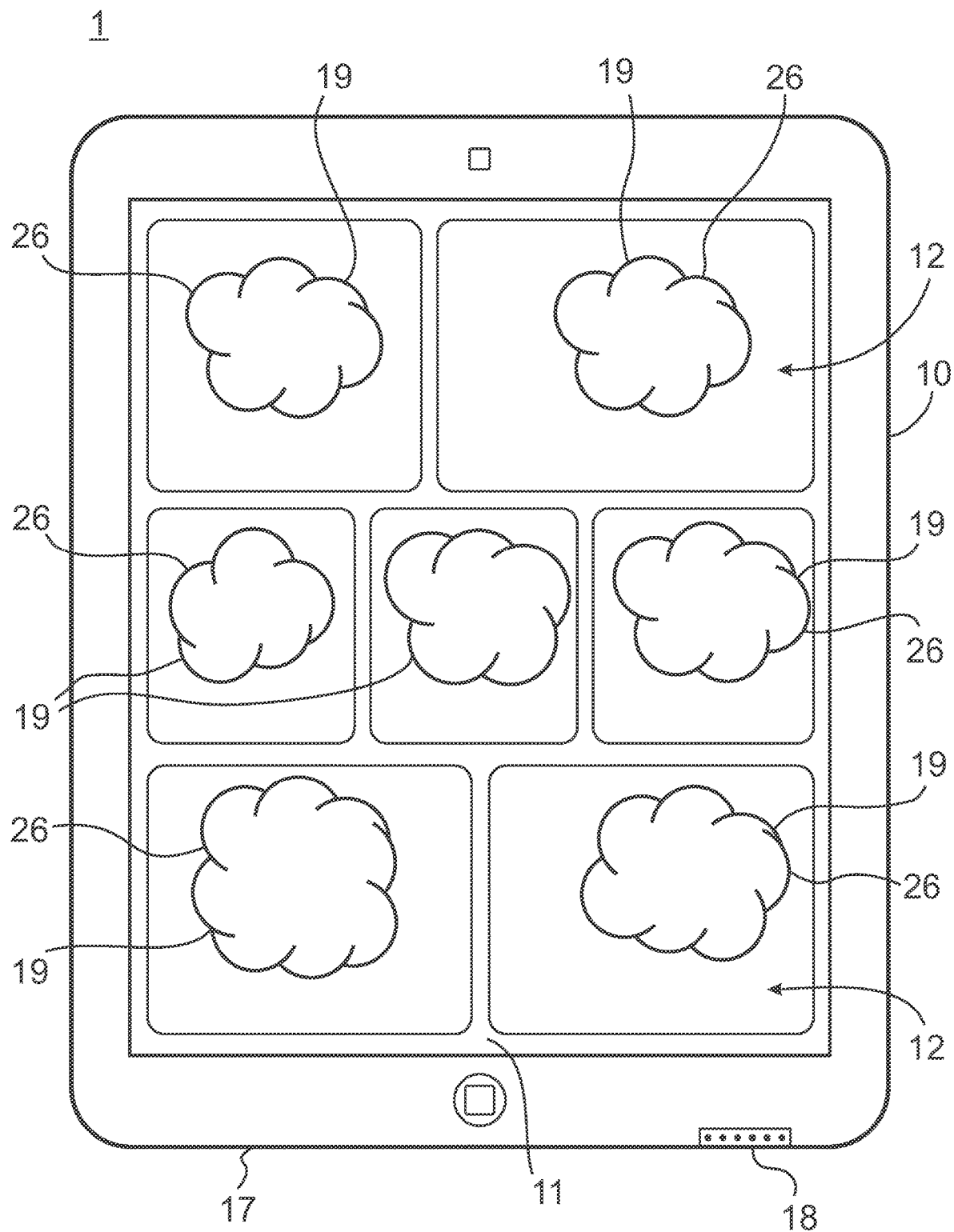
FIG. 17 is a graphical representation of a gesture selection module for the language learning system according to the invention.

With reference to FIG. 17, the gesture selection module 80 uses the computing device 10 with a touch screen 13 that provides an overlay on top of the touchscreen computing devices' operating systems' standard input and output processing techniques. The overlay on top of the input and output system identify specific areas on the screen as selectable elements, i.e. dynamic lexical elements 26, and is designed to detect and process a gesture which is recognized as an arc that would contain the elements the user desires to select.

Figure 18:
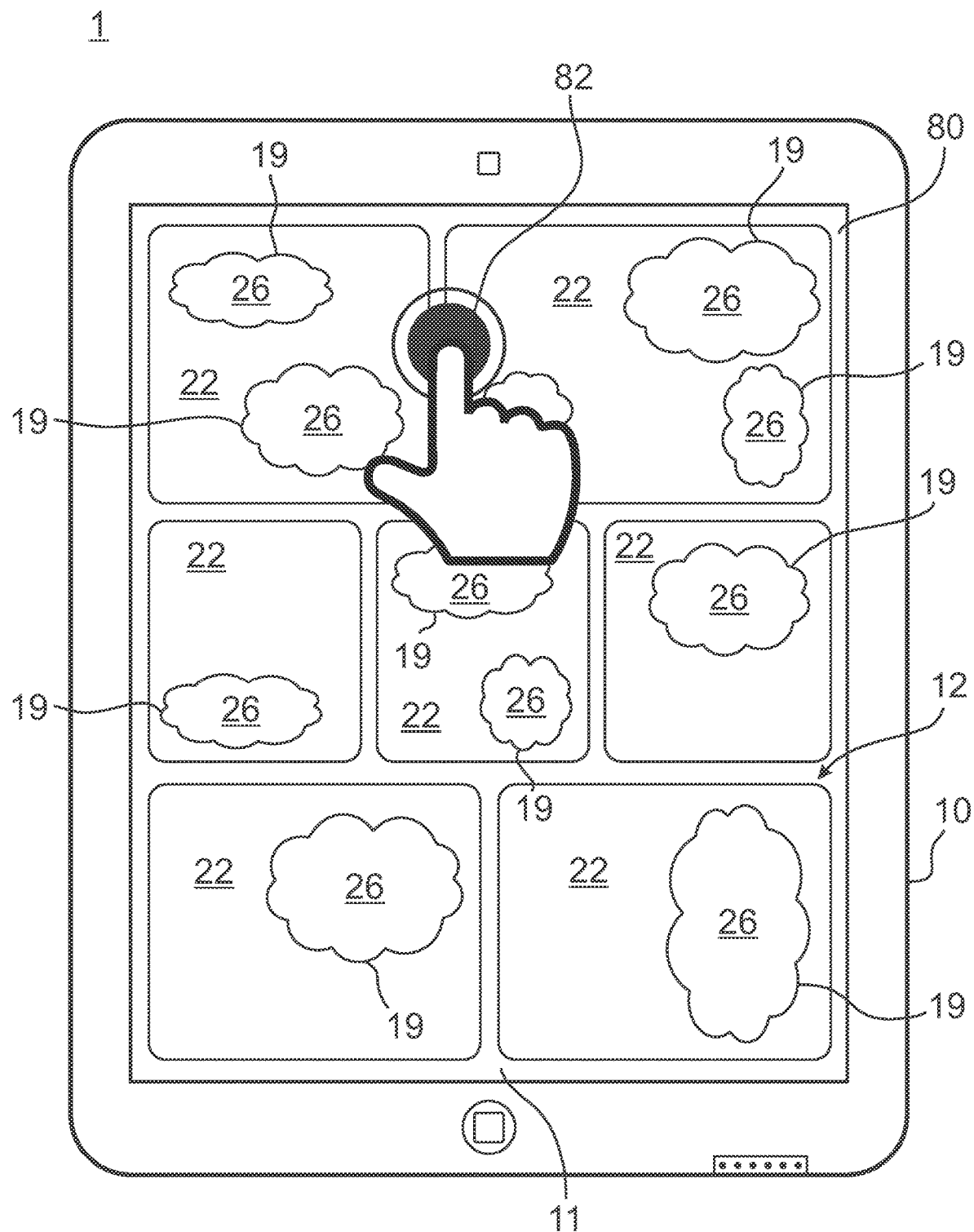
FIG. 18 is another graphical representation of the gesture selection module of FIG. 17, showing initiation of a gesture initiation location.

As further shown in FIG. 18, the user initiates the gesture selection module 80 by touching the general user interface 12. The gesture initiation location 82 of the initial touch is stored in memory device 15 and corresponds to a specific coordinate of a coordinate system of the general user interface 12.

Figure 19:
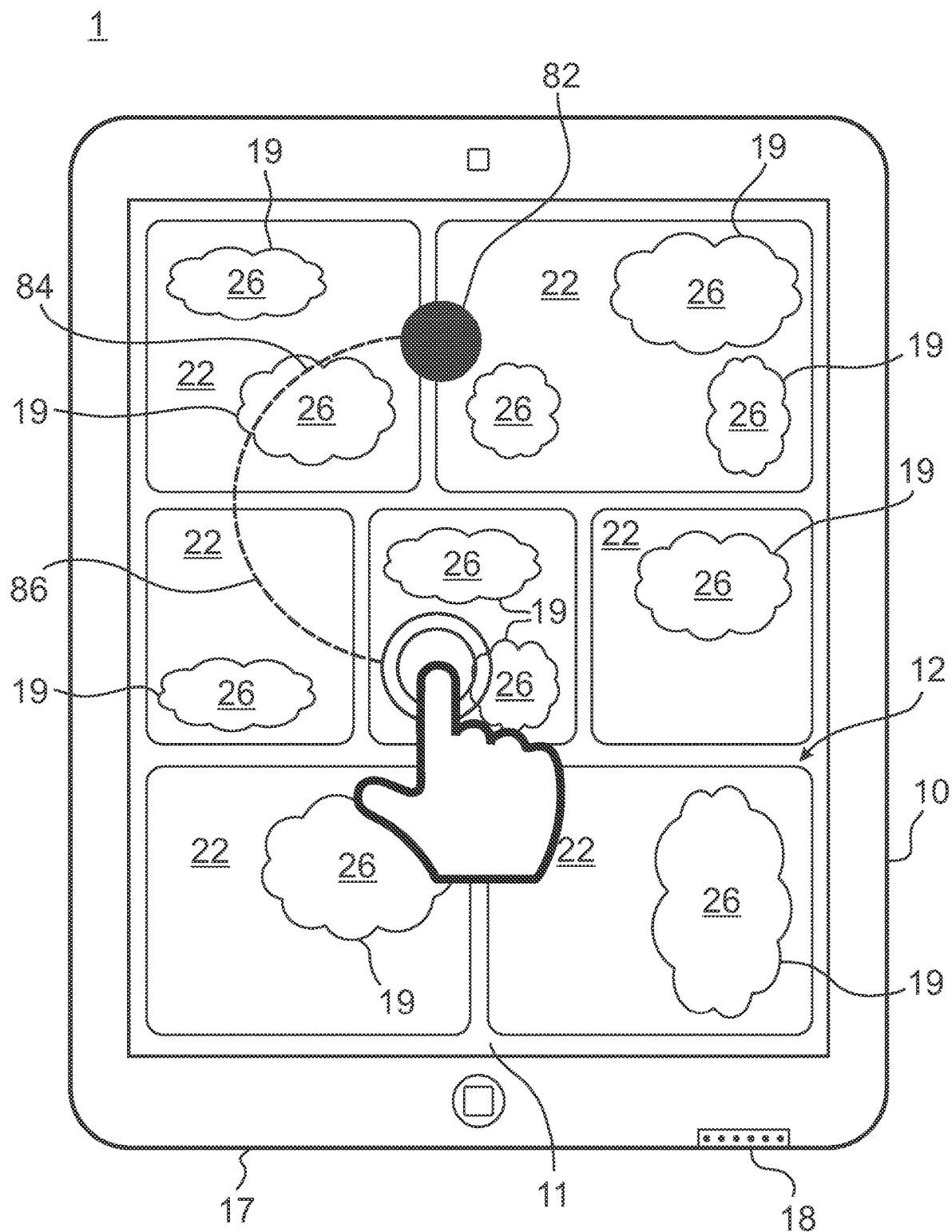
FIG. 19 is another graphical representation of the gesture selection module of FIG. 18, showing a path of a continuous arc.
Figure 20:
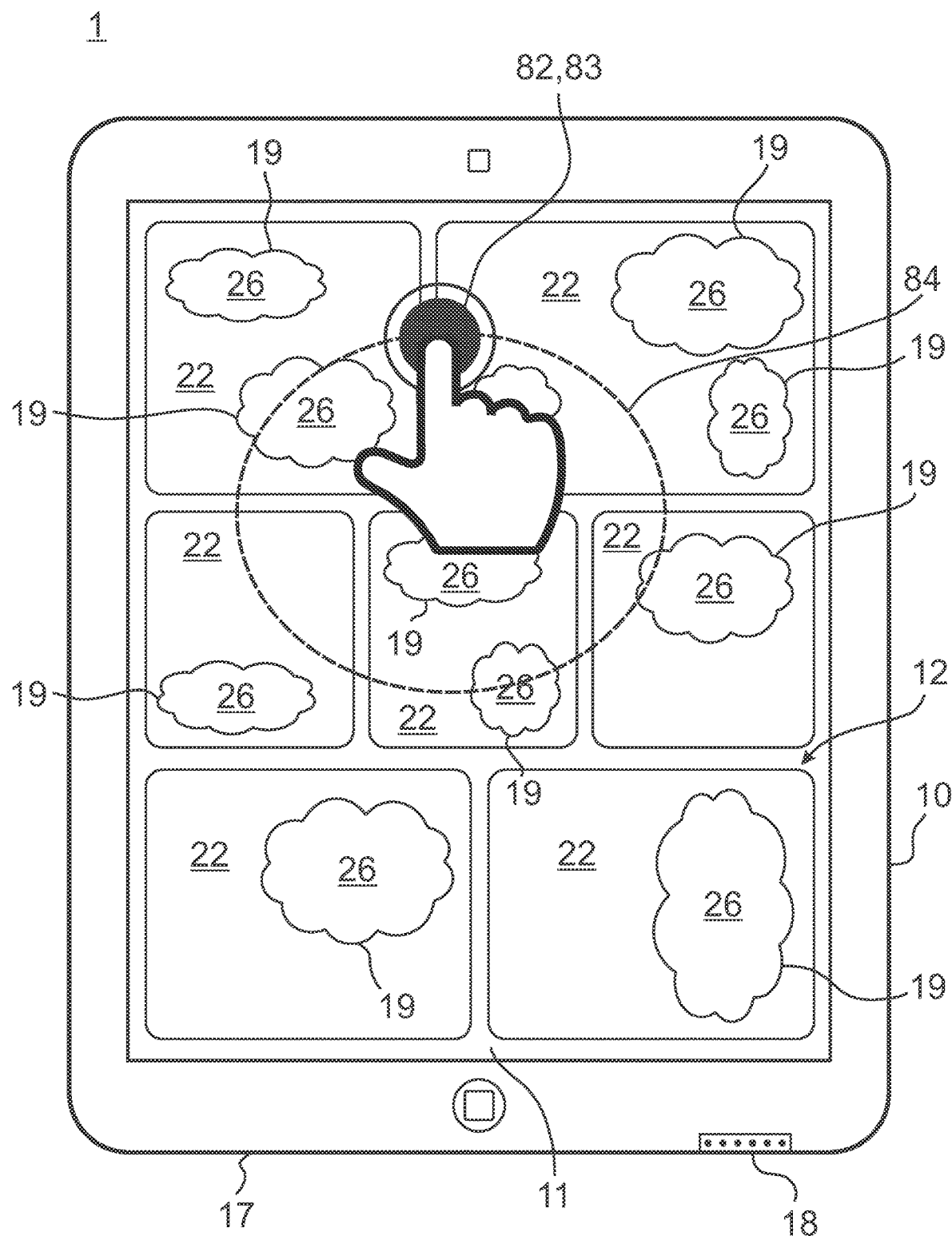
FIG. 20 is another graphical representation of the gesture selection module of FIG. 19, showing a completed path of the continuous arc.
Figure 21:
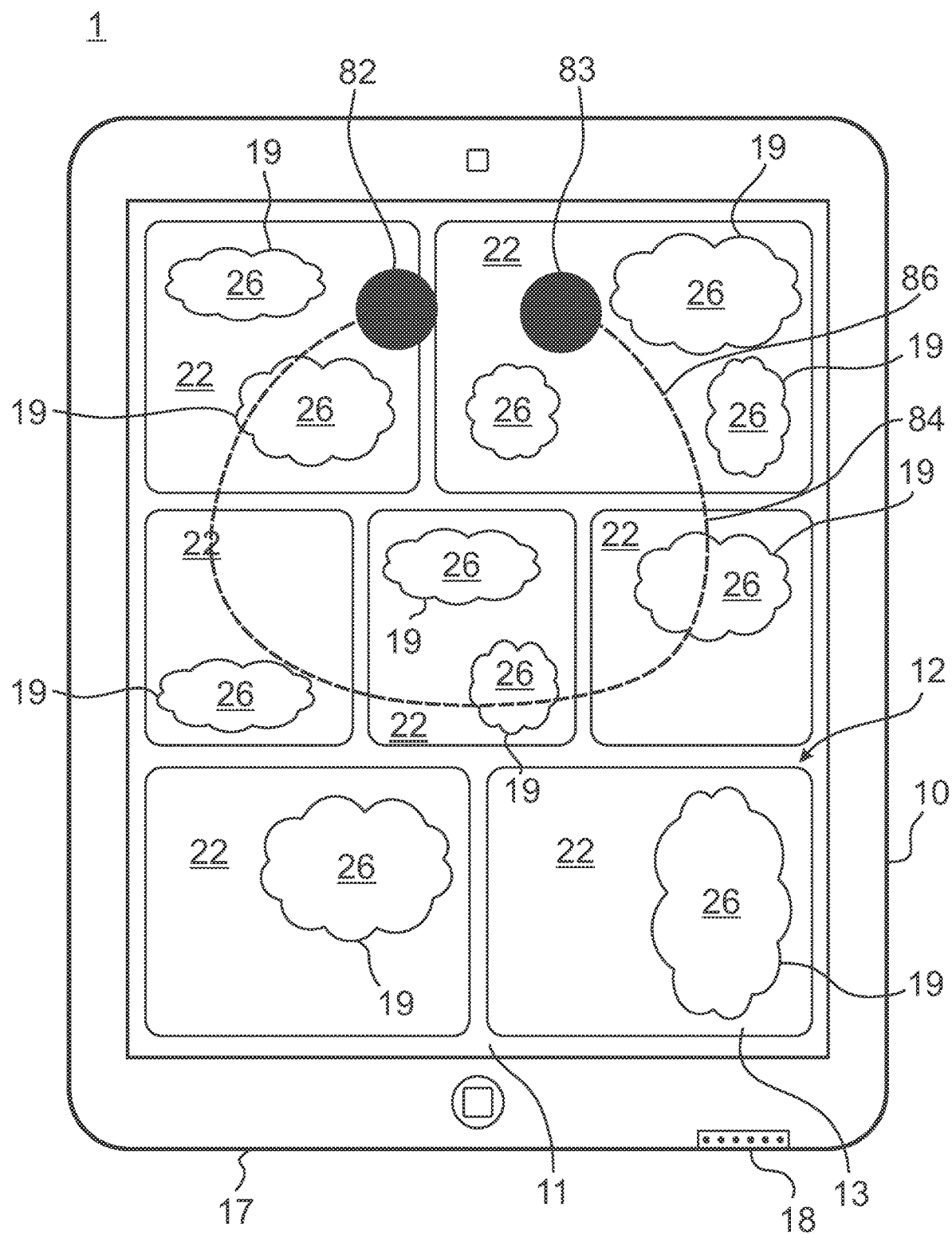
FIG. 21 is another graphical representation of the gesture selection module of FIG. 19, showing an incomplete path of the continuous arc.

As shown in FIG. 19, the user continues pressing the general user interface 12 in one continuous motion immediately following gesture initiation, by lifting the finger of the computing device 10 (e.g. touch up action), the gesture initiation location 82 is generated and stored by the gesture selection module 80. The user performs a gesture through a continuous arc 84 of constant or variable radius in the embodiment shown. However, once skilled in the art should appreciate that the gesture selection module 80 could require other geometrical paths, such as squares, rectangle, triangles, etc.

Before registering a conclusion action, by lifting the finger of the computing device 10 (e.g. touch up action), the coordinates of the continuous arc 84 are stored. If the arc path of the continuous arc 84 reaches an area within a predefined radius of the gesture initiation location 82 or the gesture selection module 80 recognizes when the user's fingers crosses the gesture path already generated the continuous arc 84 is considered completed (see FIG. 20).

It is not imperative for the gesture path of the continuous arc 84 create a closed geometric symbol (e.g. oval, circle, square, rectangle, etc.). In the case where the user lifts off of the computing device 10 (i.e. "touch up" action) before the gesture path of the continuous arc 84 is completed or crossed, the result is an open arc 86 (see FIG. 21). It is possible to evaluate the resulting arc of the open arc 86, the gesture selection module 80 uses an algorithm to determine if the user sufficiently provided an arc path that resembles the closed path of the continuous arc 84 required for the steps discussed in detail below.

Figure 22:
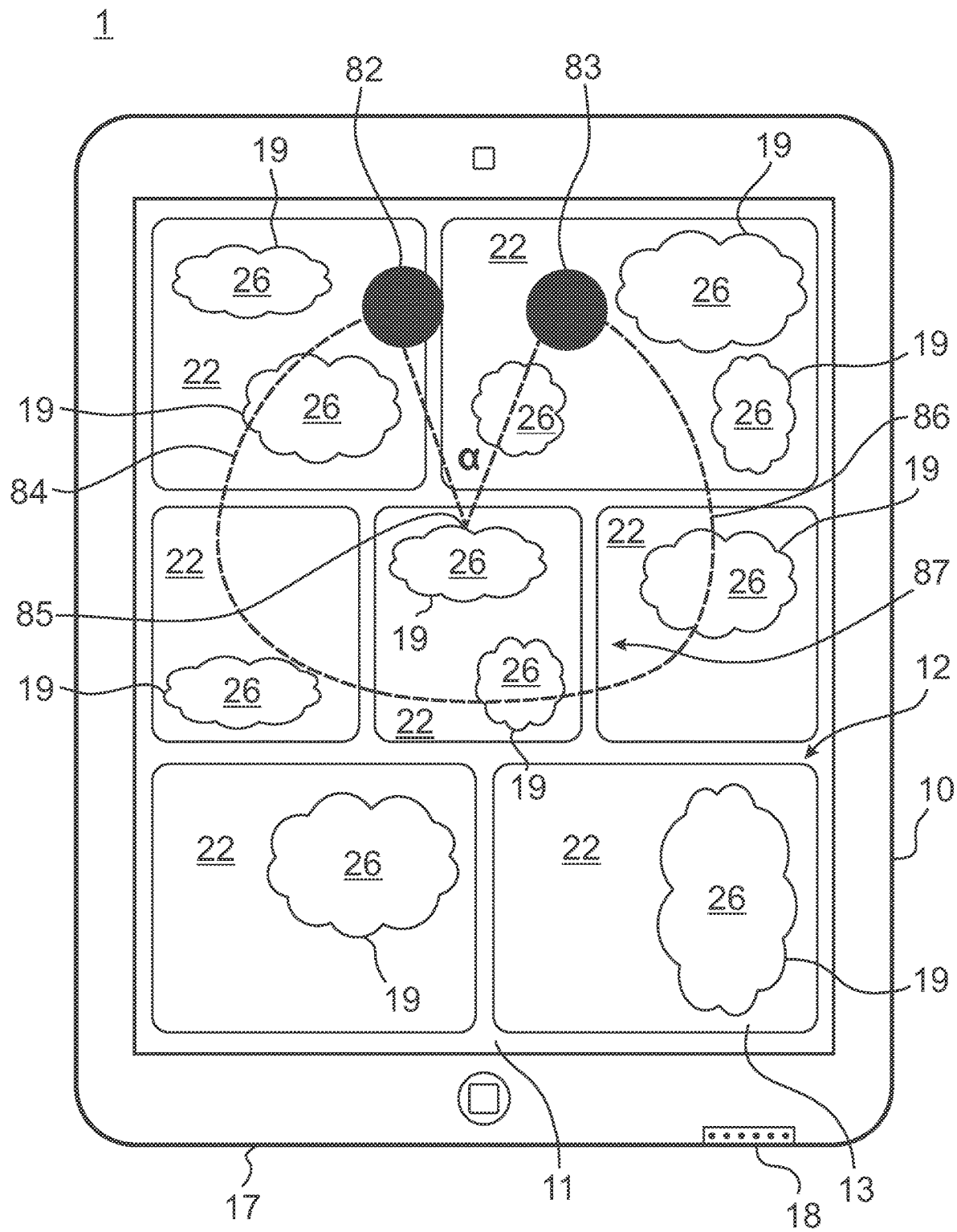
FIG. 22 is another graphical representation of the gesture selection module of FIG. 21, showing an apex of an inner arc area.
Figure 23:
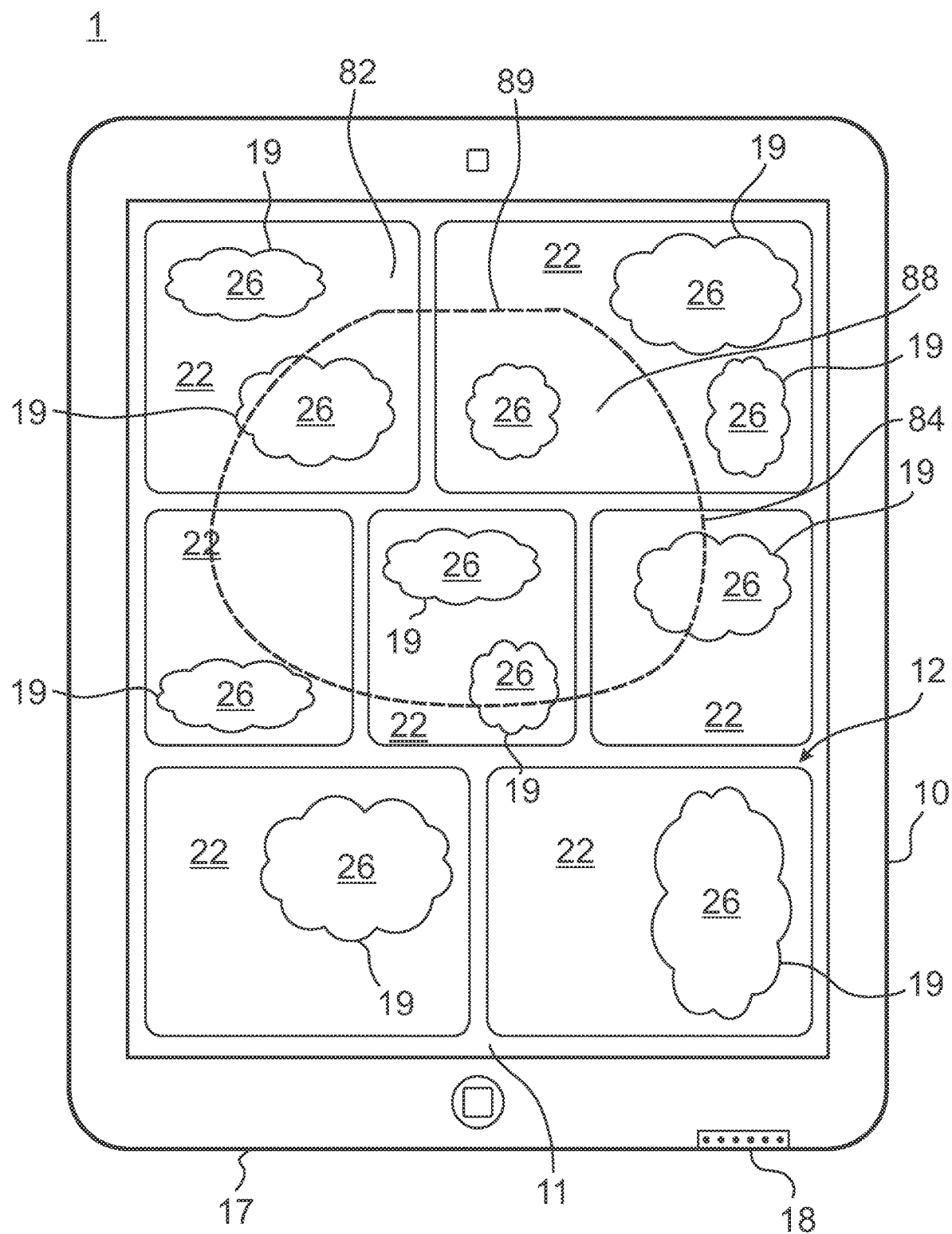
FIG. 23 is another graphical representation of the gesture selection module of FIG. 22, showing a connection line connecting the gesture initiation location and a gesture end location of the incomplete path.

As shown in FIG. 22, the gesture selection module 80 can evaluate the arc path of the continuous arc 84 by determining an angle (α) between the gesture initiation location 82 and a gesture end location 83 of the arc path of the continuous arc 84 and an apex 85 at the (approximate) center of an inner arc area 87. For instance, if this angle (α) is smaller than a pre-determined value (i.e. 15 degrees), the gesture selection module 80 will conclude the open arc 86 is completed.

Once the gesture selection module 80 concludes the arc path has been completed, as determined above, the gesture selection module 80 determines a selection area 88 enclosed by the gesture path and completed continuous arc 84. In the shown embodiment of FIG. 23, a closed oval is illustrated, and the selection area 88 area is defined as the internal area enclosed by the continuous arc 84. In the case of an open arc 86 that meets the predefined criteria for a completed gesture, the selection area 88 is defined as the internal area enclosed by the figure defined by the continuous arc 84 and a connection line 89 connecting the gesture initiation location 82 and a gesture end location 83. The gesture selection module 80 interpolates a path that will close the open arc 86 and define an enclosed subset of the selection area 88.

Figure 24:
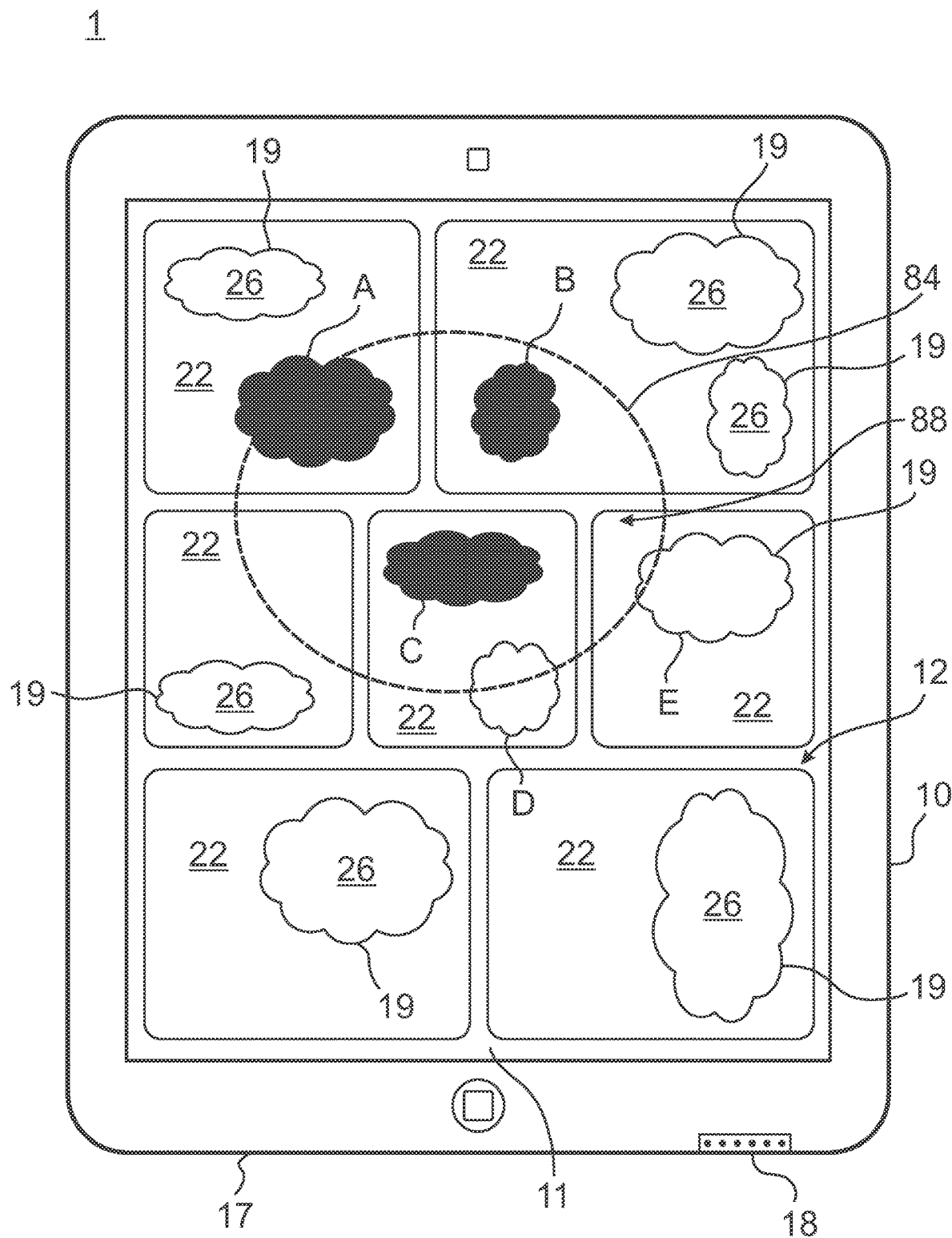
FIG. 24 is another graphical representation of the gesture selection module of FIG. 20, showing objects of interest with a selection area of the completed continuous arc.

As shown in FIG. 24, the gesture selection module 80 then determines any objects of interest, including one or more dynamic lexical elements 26, within the selection area 88.

Once the selection area 88 is determined, the gesture selection module 80 uses an element capture algorithm that can be used for determining the eligibility of each object of interest for inclusion into a selected subset (based on selection area, stored as coordinates, etc.).

For instance, the gesture selection module 80 can use a center coordinates method to determine the eligibility of each object of interest. Using the center coordinates method, the gesture selection module 80 evaluates metadata for each object of interest, i.e. one or more dynamic lexical elements 26, to determine whether the center of the object is within the enclosed area. If the center of the object, such as a center of the zone 19, is found to be within the selection area 88, the object is included in the subset stored in the memory device 15.

As shown in FIG. 24, the selection area 88 is defined by a completed continuous arc 84. Objects B and C are fully overlapped by the selection area 88, as a result they are included in the selection subset stored in the memory device 15. Since, object A is partially overlapped by the selection area with its center being inside the selection area 88, the gesture selection module 80 includes object 1 in the selection subset stored in the memory. Objects D and E are partially overlapped by the selection area with their centers outside the selection area 88, and as a result they are not included in the selection subset stored in the memory. Since all other objects are outside of the selection area 88, the gesture selection module 80 does not include them in the selection subset.

Figure 25:
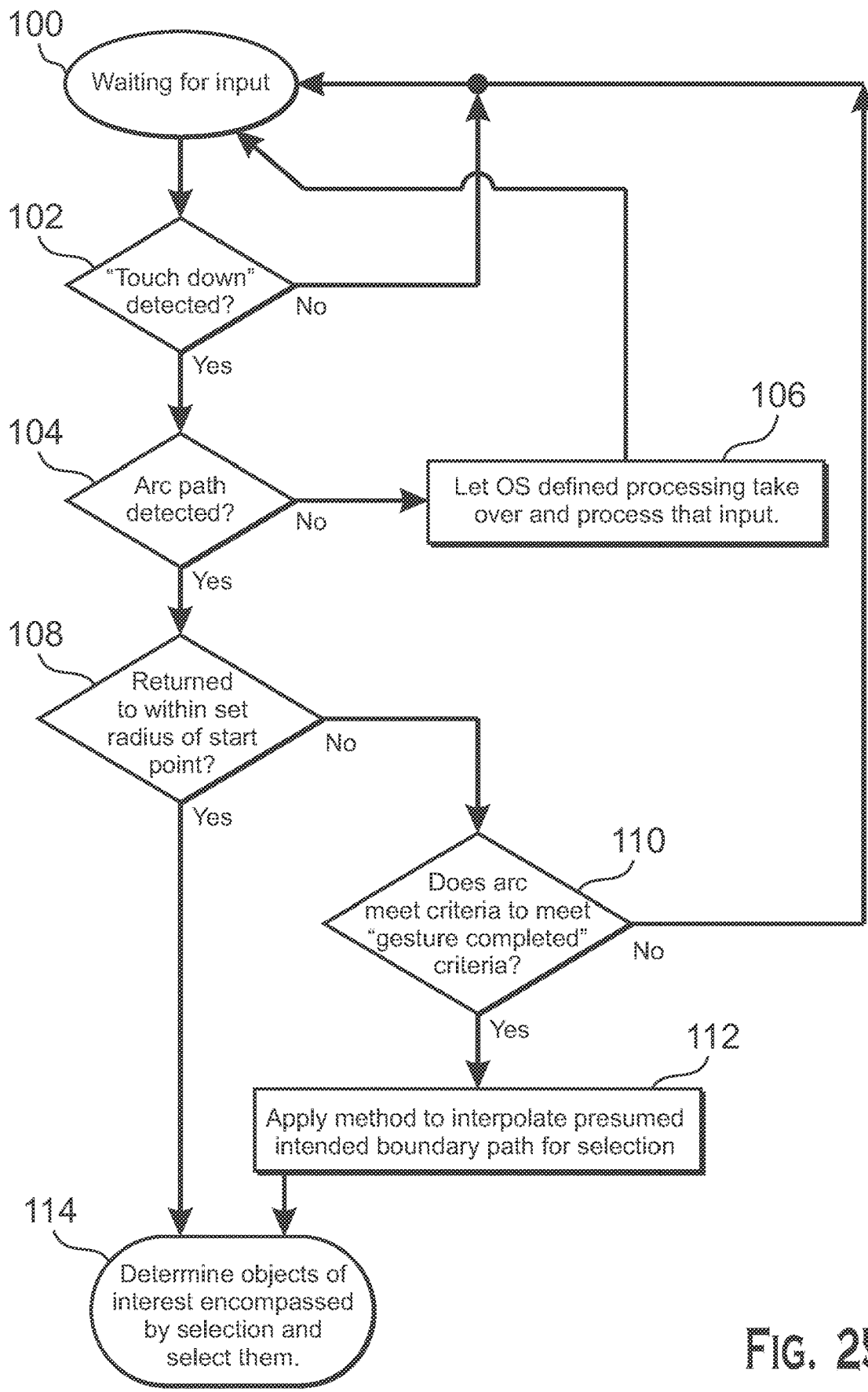
FIG. 25 is schematic flow chart of a method of gesture selection using the gesture selection module according to the invention.

FIG. 25 illustrates the general steps performed by the gesture selection module 80. In step 100, the gesture selection module 80 waits for the user to provide gesture initiation location 82. Once the user pushes down in the general user interface 12, the gesture initiation location 82 detects a "touch down" at step 102, as defined above. At step 104, the gesture selection module 80 determines is a continuous arc 84 has been started. If not, at step 106, the gesture selection module 80 allows the computing device operating system to take over and process movement on the touchscreen 13. At step 108, if a continuous arc 84 is determined, the gesture selection module 80 determines if the continuous arc 84 has been completed by connecting the gesture initiation location 82 and a gesture end location 83. If the user does not complete the continuous arc 84, the gesture selection module 80 applies a method to interpolate presumed intended boundaries of continuous arc 84, as completed. If not, the computing device operating system to take over and process movement on the touchscreen 13 by step 106. However, if the gesture selection module 80 does determine a selection are, objects of interest, such as dynamic lexical elements 26, encompassed in the selection area are selected and stored memory device 15, which can then be transferred to a user personal file or account.

The language learning system 1 according to the invention makes use of the multimedia capabilities of computers and mobile devices, and leverages the communicative capability of a publication, such as a graphic novel/comic book format to provide a variety of contextual elements (e.g. locale, character, storyline), while the computational power of the device allows instructional elements to be stored and presented in multiple languages, both in textual format and in recorded audio. The language learning system 1 will absorb the content of the pictorial context, and then can utilize the touchscreen interface to initiate the translations, cause the lexical elements to change from one language to another, i.e. a native language to a secondary language, as well as initiate the playing of the pre-recorded proper pronunciation of lexical elements. The language learning system 1 allows the user to record his/her own pronunciation of the words and compare it to the pre-recorded proper pronunciation via auditory elements. The embedded translations are not automatically generated in real-time, but instead have been written (in the case of textual translations) and recorded (in the case of audio translations) previously by a professional staff and stored in a language learning file. Consequently, the translations of lexical elements reflect proper grammar and pronunciation.

The foregoing illustrates some of the possibilities for practicing the invention. Many other embodiments are possible within the scope and spirit of the invention. Therefore, more or less of the aforementioned components can be used to conform to that particular purpose. It is, therefore, intended that the foregoing description be regarded as illustrative rather than limiting, and that the scope of the invention is given by the appended claims together with their full range of equivalents.

What is claimed is:

1. A language learning system, comprising:
a computing device having:
   (a) a frame extending around a rectangular periphery of the computing device,
      (1) a touch screen display positioned in the frame for use with a finger or a stylus, and
   (b) an audio input device, the audio input device is a microphone positioned along an edge of the frame to receive an audio input signal, and
   (c) an audio output device, the audio output device is mounted along a periphery of the frame at a distance from the audio input device, and
      (1) a general user interface, and
      (2) a central processing unit for receiving the audio input signal and for transmitting an output signal through the audio output device; and
a language learning file unit run by the central processing unit and having:
   (a) a multilingual data storage containing multilingual data having:
      (1) graphical constant elements,
      (2) dynamic lexical elements corresponding to the graphical constant elements, the dynamic lexical elements having:
         a. native language data, and
         b. secondary language data corresponding to and translating from the native language data,
   (b) a language display module simultaneously displaying a plurality of sequential images of graphical constant elements oriented in a plurality of different angular positions relative to the frame and native language elements with the native language data corresponding to the graphical constant element positioned adjacent thereto, through the general user interface, in juxtaposed positions in a plurality of differently sized separate zones and, the plurality of sequential images positioned to form a storyline tiled over a plurality of differently sized image panels, and
   (c) a language learning module replacing a display of the native language element with a secondary language element of the secondary language data.

2. The language learning system of claim 1, wherein the multilingual data includes auditory elements corresponding to a pronunciation the dynamic lexical elements.

3. The language learning system of claim 2, wherein the language learning module performs auditory function of the auditory elements corresponding to the native language data and the secondary language data.

4. The language learning system of claim 2, wherein the multilingual data is stored in a relational databases and listed in related tables that match up to links identified as zones along the general user interface.

5. The language learning system of claim 4, wherein the zones correspond to coordinates along the general user interface.

6. The language learning system of claim 1, wherein the graphical constant element is a pictorial display of an individual image containing a segment of action.

7. The language learning system of claim 6, wherein the dynamic lexical elements are displayed text depicting dialogue, narration, sound effects, or other information relating to the graphical constant element juxtaposed to the dynamic lexical elements.

8. The language learning system of claim 7, wherein the dynamic lexical elements are native language elements displayed from the native language data.

9. The language learning system of claim 8, wherein the language learning module displays a translation interaction module displaying the native language element in a native language display section and a secondary language element in a secondary language display section.

10. The language learning system of claim 9, wherein the language learning module includes an audio wave-form analysis module displayed through translation interaction module display.

11. The language learning system of claim 10, wherein the audio wave-form analysis module allows the user to prepare an audio recording of the secondary language element.

12. The language learning system of claim 11, wherein the audio recording is a user's attempt to mimic a proper pronunciation of a secondary auditory element's broadcast of the secondary language element.

13. The language learning system of claim 12, wherein the audio wave-form analysis module then displays an audio window that graphically displays a comparison of the audio recording to a proper pronunciation of a native auditory element of the native language element.

* * * * *